United States Patent
Kurioka et al.

(10) Patent No.: US 10,884,224 B2
(45) Date of Patent: Jan. 5, 2021

(54) IMAGING OPTICAL SYSTEM, AND IMAGING DEVICE AND CAMERA SYSTEM PROVIDED WITH IMAGING OPTICAL SYSTEM

(71) Applicant: Panasonic Intellectual Property Management Co., Ltd., Osaka (JP)

(72) Inventors: Yoshiaki Kurioka, Osaka (JP); Takahiro Kitada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 443 days.

(21) Appl. No.: 15/850,537

(22) Filed: Dec. 21, 2017

(65) Prior Publication Data

US 2018/0180860 A1 Jun. 28, 2018

(30) Foreign Application Priority Data

Dec. 28, 2016 (JP) .................................. 2016-254961

(51) Int. Cl.
*G02B 15/173* (2006.01)
*G02B 13/02* (2006.01)
(Continued)

(52) U.S. Cl.
CPC ........... *G02B 15/173* (2013.01); *G02B 13/02* (2013.01); *G02B 15/1451* (2019.08);
(Continued)

(58) Field of Classification Search
CPC .. G02B 15/173; G02B 13/02; G02B 27/0025; G02B 27/4205; G02B 27/646;
(Continued)

(56) References Cited

U.S. PATENT DOCUMENTS

| 2001/0005288 A1* | 6/2001 | Hayashi | ................... G02B 7/10 |
| | | | 359/826 |
| 2013/0242166 A1* | 9/2013 | Hosoi | ................... G02B 15/14 |
| | | | 348/345 |

(Continued)

FOREIGN PATENT DOCUMENTS

| JP | 2015-99175 | 5/2015 |
| JP | 5798255 | 10/2015 |

(Continued)

*Primary Examiner* — Travis S Fissel
(74) *Attorney, Agent, or Firm* — Wenderoth, Lind & Ponack, L.L.P.

(57) ABSTRACT

An imaging optical system of the present disclosure includes a first lens group having positive power, a second lens group having negative power, a third lens group having the positive power, and a succeeding lens group including one or more lens groups in order from an object side toward an image side. The third lens group includes a lens having the positive power and a lens having the positive power in order from the object side toward the image side, and includes a lens L3R1 having the positive power, a lens L3R2 having the positive power, and a lens L3R3 having the negative power in order from the image side toward the object side. The lens L3R2 and the lens L3R3 are bonded, the lens L3R1 moves to optically correct image blur, and at least a distance between the second lens group and the third lens group changes during zooming from a wide angle end to a telephoto end.

15 Claims, 18 Drawing Sheets

(51) Int. Cl.
   *G02B 27/00*   (2006.01)
   *G02B 27/64*   (2006.01)
   *G02B 27/42*   (2006.01)
   *G02B 15/14*   (2006.01)

(52) U.S. Cl.
   CPC ..... *G02B 27/0025* (2013.01); *G02B 27/4205* (2013.01); *G02B 27/646* (2013.01); *G02B 15/145121* (2019.08); *G03B 2205/0007* (2013.01)

(58) Field of Classification Search
   CPC ............ G02B 15/14; G02B 15/144105; G02B 15/145105; G02B 15/145129; G02B 15/1451; G02B 15/1441; G02B 15/145121; G02B 13/18; G03B 2205/0007
   USPC ................................ 359/686, 687, 689, 690
   See application file for complete search history.

(56) References Cited

U.S. PATENT DOCUMENTS

2015/0085165 A1\* 3/2015 Maruyama ............. G02B 13/18
                                                        348/240.3
2015/0185448 A1   7/2015 Kawamura
2016/0109692 A1   4/2016 Shibata

FOREIGN PATENT DOCUMENTS

| JP | 5861971 | 2/2016 |
|---|---|---|
| JP | 2016-71179 | 5/2016 |

\* cited by examiner

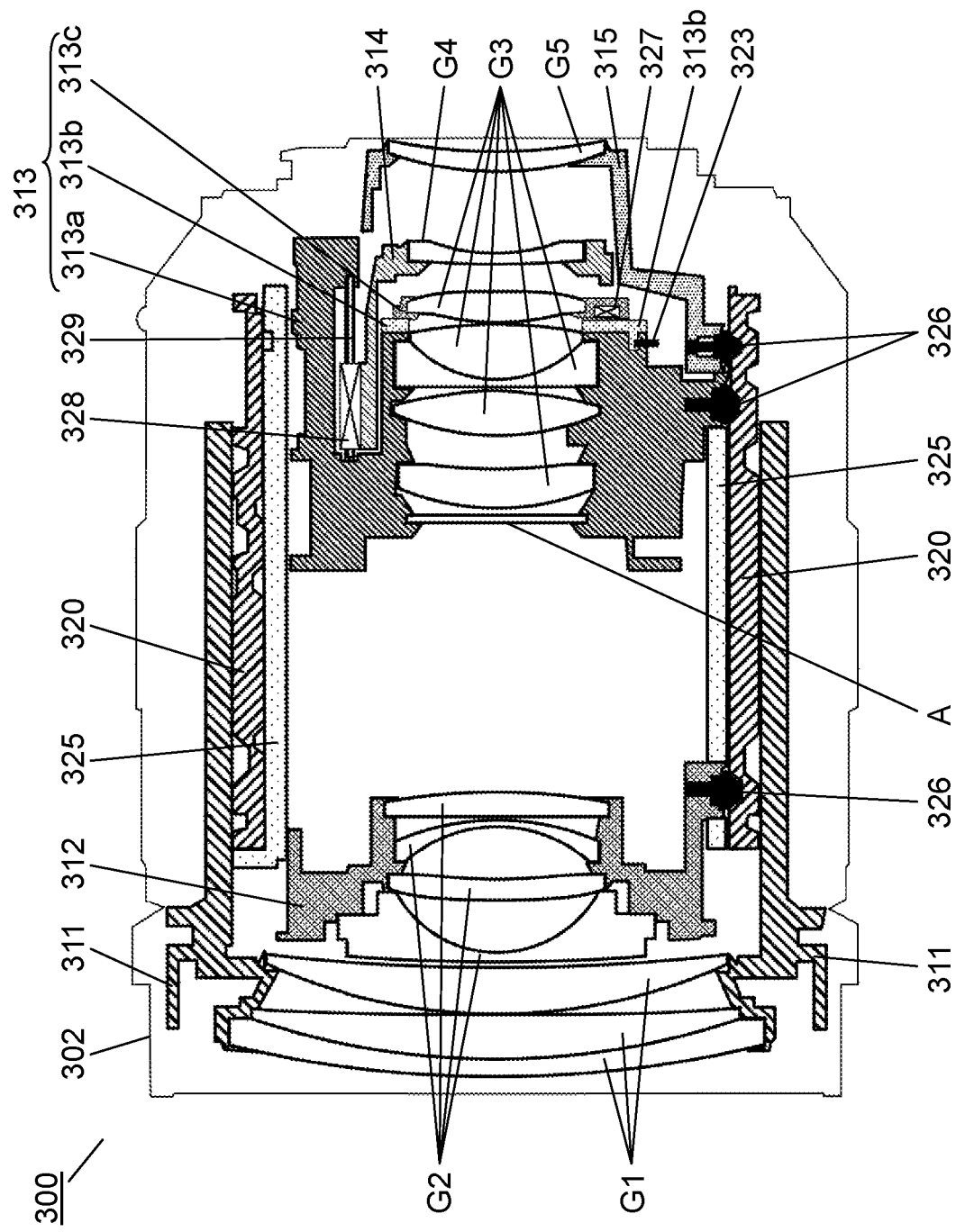

IMAGING OPTICAL SYSTEM, AND IMAGING DEVICE AND CAMERA SYSTEM PROVIDED WITH IMAGING OPTICAL SYSTEM

BACKGROUND

1. Technical Field

The present disclosure relates to an imaging optical system having good various aberrations, and an imaging device and a camera system which are provided with the imaging optical system.

2. Description of Related Art

Unexamined Japanese Patent Publication No. 2016-71179 discloses a zoom lens including a first lens group having positive refractive power, a second lens group having negative refractive power, a third lens group having positive refractive power, a fourth lens group having negative refractive power, and a fifth lens group having positive refractive power in order from an object side toward an image side. In the zoom lens, the fifth lens group is fixed, and the first lens group, the second lens group, the third lens group, and the fourth lens group are moved in an optical axis direction, thereby changing magnification.

SUMMARY

An imaging optical system according to the present disclosure includes a first lens group having positive power, a second lens group having negative power, a third lens group having the positive power, and a succeeding lens group including one or more lens groups in order from an object side toward an image side. The third lens group includes a lens L3F1 having the positive power and a lens L3F2 having the positive power in order from the object side toward the image side, and includes a lens L3R1 having the positive power, a lens L3R2 having the positive power, and a lens L3R3 having the negative power in order from the image side toward the object side. One of optical surfaces of each of the lens L3R3 and the lens L3R2 are bonded to each other. The lens L3R1 moves in a direction perpendicular to an optical axis to optically correct image blur. During the zooming from the wide angle end to the telephoto end in the imaging, at least the second lens group and the third lens group move in an optical axis direction such that a distance between the second lens group and the third lens group changes.

BRIEF DESCRIPTION OF DRAWINGS

FIG. 18 is a schematic configuration diagram illustrating a lens barrel provided with the imaging optical system of the first exemplary embodiment.

DETAILED DESCRIPTION

Exemplary Embodiments

Figure 1:
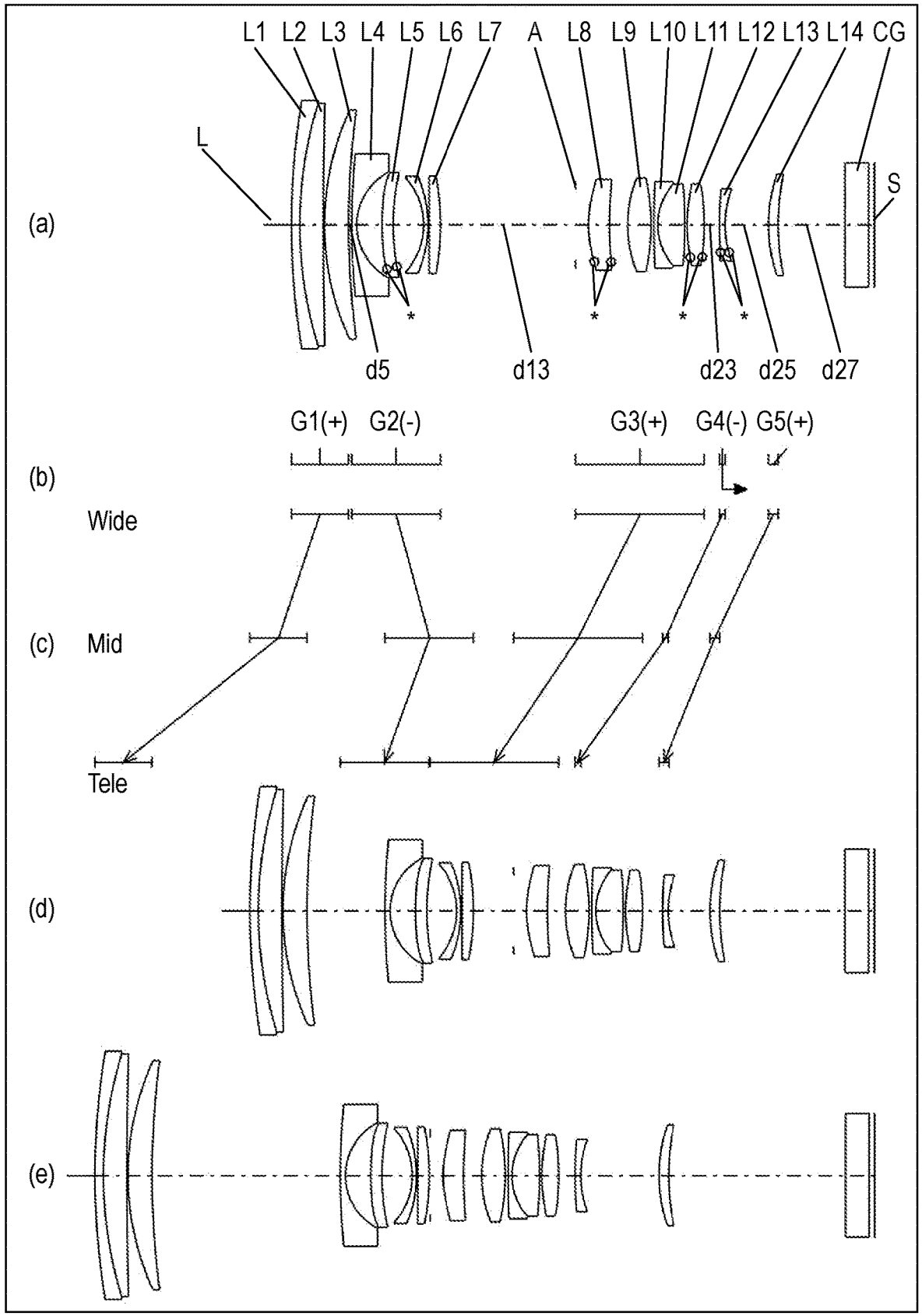
FIG. 1 is a view illustrating lens arrangement in an infinity focusing state of an imaging optical system according to a first exemplary embodiment.
Figure 2:
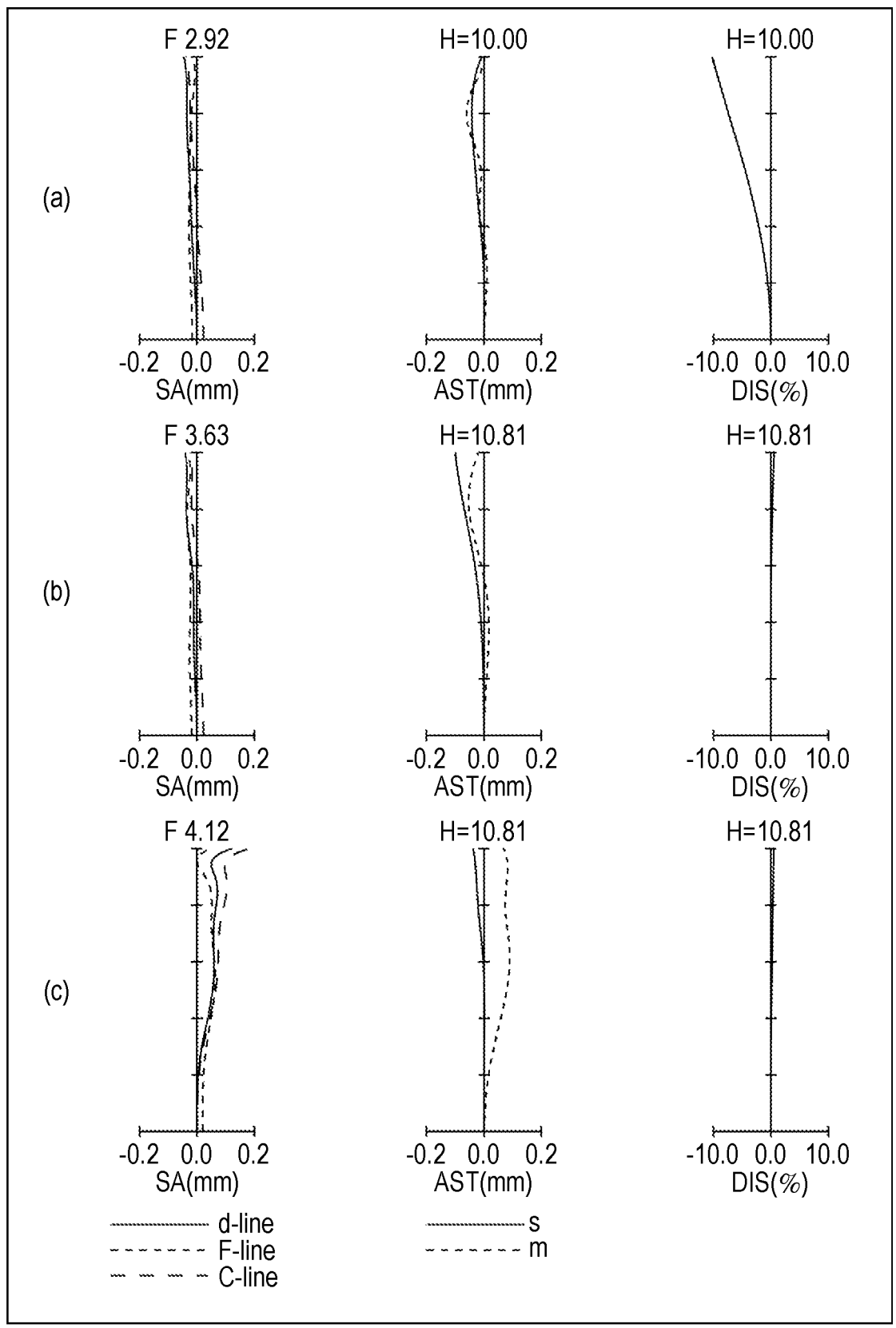
FIG. 2 is a view illustrating a longitudinal aberration in the infinity focusing state of an imaging optical system according to a first numerical example of the first exemplary embodiment.
Figure 3:
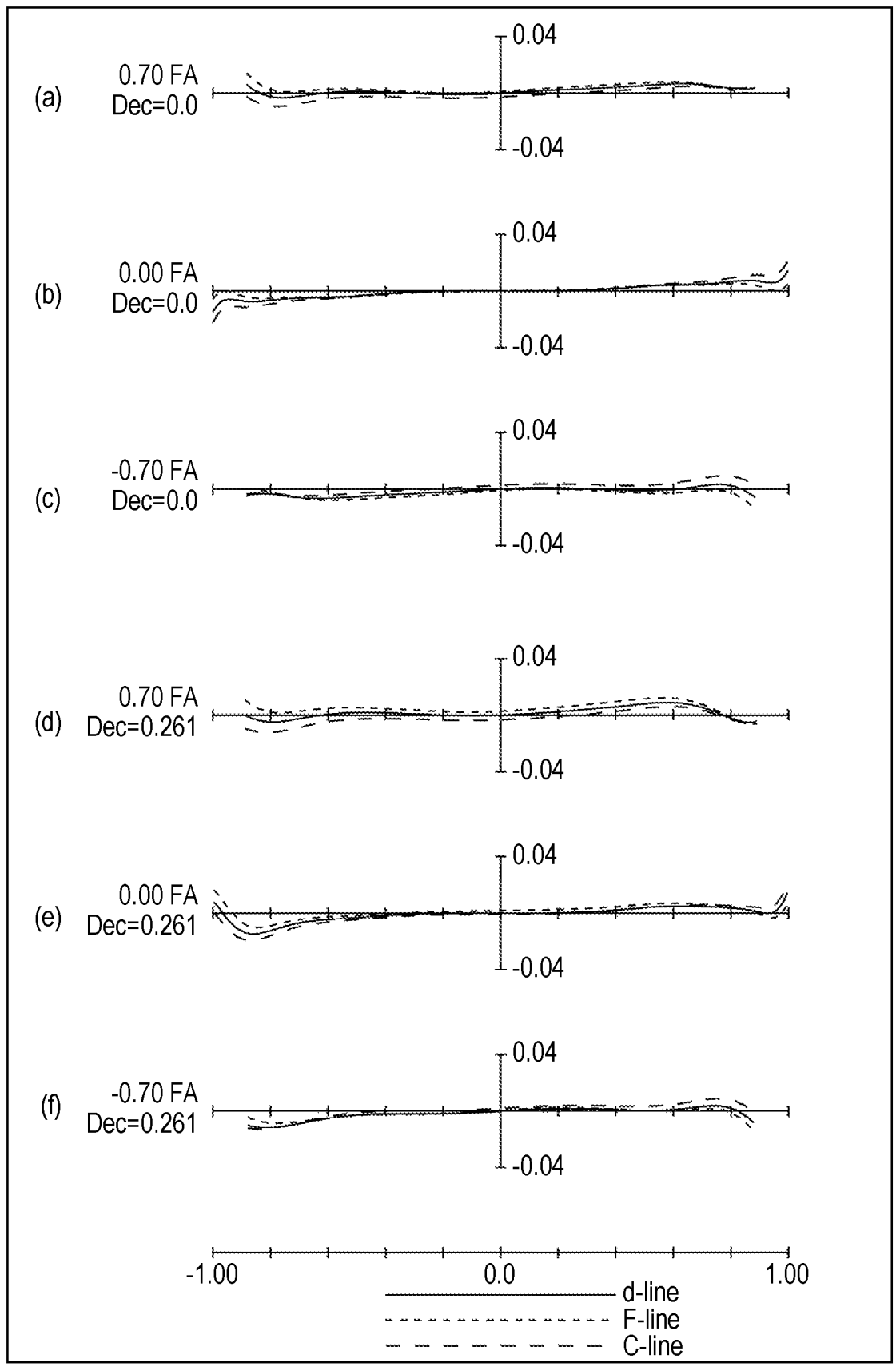
FIG. 3 is a view illustrating a lateral aberration in a basic state in which image blur is not corrected and an image blur correction state at a telephoto end of the imaging optical system of the first numerical example.

Hereinafter, exemplary embodiments will be described in detail with reference to the drawings. However, descriptions in more detail than necessary may be omitted. For example, a detailed description of a matter which is already well-known and a repeated description for a substantially identical configuration may be omitted. This is intended to avoid unnecessary redundancy of the following description and to facilitate understanding by those skilled in the art.

Note that the attached drawings and the following description are provided for those skilled in the art to fully understand the present disclosure, and are not intended to limit the subject matter as described in the claims.

First to Fifth Exemplary Embodiments

An imaging optical system according to first to fifth exemplary embodiments will be described below with reference to the drawings.

The imaging optical system of each exemplary embodiment includes first lens group G1, second lens group G2, third lens group G3, and a succeeding lens group.

FIGS. 1, 4, 7, 10, and 13 are views illustrating lens arrangement of the imaging optical system in an infinity focusing state.

Part (a) of FIGS. 1, 4, 7, 10, 13 illustrates the lens arrangement at a wide angle end (shortest focal distance state: focal distance fw). Part (d) of FIGS. 1, 4, 7, 10, 13 illustrates the lens arrangement at an intermediate position (intermediate focal distance state: focal distance fM=√(fw*fT)). Part (e) of FIGS. 1, 4, 7, 10, 13 illustrates the lens arrangement at a telephoto end (longest focal distance state: focal distance fT). An aspect ratio is identical in parts (a), (d), (e) of FIGS. 1, 4, 7, 10, 13.

A polygonal-line arrow illustrated in part (c) of FIGS. 1, 4, 7, 10, 13 indicates positions of each lens group in states of a wide angle end (Wide), an intermediate position (Mid), and a telephoto end (Tele), which are connected from top to bottom. The arrow simply connects by the line between the wide angle end and the intermediate position, and between the intermediate position and the telephoto end, but does not indicate actual movement of each lens group. That is, the arrow illustrated in part (c) of FIGS. 1, 4, 7, 10, 13 conveniently indicates a movement direction of each lens group during focusing from the infinity focusing state to a proximity focusing state.

In part (b) of FIGS. 1, 4, 7, 10, 13, the lens groups are designated by numerals G1 to G5, corresponding to the positions of the lens groups illustrated in part (a).

The specific movement direction in which each lens group moves during the focusing in each zooming state will be described later in each exemplary embodiment.

An asterisk * attached to a surface of a specific lens in part (a) of FIGS. 1, 4, 7, 10, 13 indicates that the surface is an aspherical surface.

Symbols (+) and (−) attached to the numeral of each lens group (G1 to G5) in part (b) of FIGS. 1, 4, 7, 10, 13 correspond to power of each lens group. That is, the symbol (+) indicates positive power, and symbol (−) indicates negative power.

In parts (a), (d), (e) of FIGS. 1, 4, 7, 10, 13, a straight line drawn at a rightmost side indicates a position of image surface S (an object-side surface of the imaging device). Consequently, the left side of the drawings corresponds to the object side. Parallel plate CG such as a low-pass filter and a cover glass is disposed between image surface S and the last-stage lens group facing image surface S.

First Exemplary Embodiment

An imaging optical system according to a first exemplary embodiment will be described below with reference to FIG. 1.

FIG. 1 illustrates the lens arrangement of the imaging optical system of the first exemplary embodiment and operation of the imaging optical system.

As illustrated in FIG. 1, the imaging optical system of the first exemplary embodiment includes first lens group G1 having positive power, second lens group G2 having negative power, aperture diaphragm A, third lens group G3 having the positive power, a succeeding lens group including one or more lens groups, and parallel plate CG in order from the object side toward the image side. For example, the succeeding lens group includes fourth lens group G4 having the negative power and fifth lens group G5 having the positive power. The imaging optical systems of the second to fifth exemplary embodiments have the similar configuration.

First lens group G1 includes first lens L1 having the negative power, second lens L2 having the positive power, and third lens L3 having the positive power in order from the object side toward the image side. First lens L1 and second lens L2 are constructed with a cemented lens that is bonded using an adhesive such as ultraviolet curing resin.

Second lens group G2 includes fourth lens L4 having the negative power, fifth lens L5 having the negative power, sixth lens L6 having the negative power, and seventh lens L7 having the positive power in order from the object side toward the image side. Fourth lens L4 is exemplified by lens L2F1. Fifth lens L5 is exemplified by lens L2F2 and lens L2R3. Sixth lens L6 is exemplified by lens L2R2. Seventh lens L7 is exemplified by lens L2R1.

Third lens group G3 includes eighth lens L8 having the positive power, ninth lens L9 having the positive power, tenth lens L10 having the negative power, eleventh lens L11 having the positive power, and twelfth lens L12 having the positive power in order from the object side toward the image side. Tenth lens L10 and eleventh lens L11 are constructed with a cemented lens that is bonded using an adhesive such as ultraviolet curing resin. Eighth lens L8 is exemplified by lens L3F1. Ninth lens L9 is exemplified by lens L3F2. Tenth lens L10 is exemplified by lens L3R3. Eleventh lens L11 is exemplified by lens L3R2. Twelfth lens L12 is exemplified by lens L3R1.

Fourth lens group G4 includes thirteenth lens L13 having the negative power.

Fifth lens group G5 includes fourteenth lens L14 having the positive power.

Aperture diaphragm A is disposed between seventh lens L7 of second lens group G2 and eighth lens L8 of third lens group G3.

The lens constituting each lens group of the imaging optical system of the first exemplary embodiment will be described below.

First, each lens in first lens group G1 will be described.

First lens L1 is a meniscus lens having a convex surface on the object side. Second lens L2 is a meniscus lens having the convex surface on the object side. Third lens L3 is a meniscus lens having the convex surface on the object side.

Then, each lens in second lens group G2 will be described.

Fourth lens L4 is a meniscus lens having the convex surface on the object side. Fifth lens L5 is a meniscus lens having the convex surface on the object side. Both surfaces of fifth lens L5 are aspherical surfaces. Sixth lens L6 is a meniscus lens having a concave surface on the object side. Seventh lens L7 is a biconvex lens.

Then, each lens in third lens group G3 will be described.

Eighth lens L8 is a meniscus lens having the convex surface on the object side. Both surfaces of eighth lens L8 are aspherical surfaces. Ninth lens L9 is a biconvex lens. Tenth lens L10 is a meniscus lens having the convex surface on the object side. Eleventh lens L11 is a biconvex lens.

Twelfth lens L12 is a biconvex lens. Both surfaces of twelfth lens L12 are aspherical surfaces.

Then, each lens in fourth lens group G4 will be described.

Thirteenth lens L13 is a meniscus lens having the convex surface on the object side. Both surfaces of thirteenth lens L13 are aspherical surfaces.

Then, each lens in fifth lens group G5 will be described.

Fourteenth lens L14 is a meniscus lens having the convex surface on the object side.

The imaging optical system of the first exemplary embodiment having the above configuration includes five lens groups.

Each lens group of the imaging optical system of the first exemplary embodiment moves as indicated by the arrow in part (c) of FIG. 1 during zooming from the wide angle end (Wide) to the telephoto end (Tele) in imaging.

Specifically, first lens group G1 moves onto the object side, and second lens group G2 moves onto the side of image surface S so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. A distance between third lens group G3 and fourth lens group G4 increases from the wide angle end to the intermediate position, and decreases from the intermediate position to the telephoto end. A distance between fourth lens group G4 and fifth lens group G5 decreases from the wide angle end to the intermediate position, and increases from the intermediate position to the telephoto end. A distance between fifth lens group G5 and image surface S increases. During the zooming from the wide angle end to the telephoto end, an open aperture diameter of aperture diaphragm A is identical from the wide angle end to the intermediate position, and increases at the telephoto end compared with the intermediate position. Consequently, a movement amount of a diaphragm unit from the wide angle end to the telephoto end can be decreased.

As described above, each lens group moves along optical axis L as indicated by the arrow in part (c) of FIG. 1. As illustrated in parts (a), (d), (e) of FIG. 1, each lens group is disposed at the wide angle end, the intermediate position, and the telephoto end.

That is, in the imaging optical system of the first exemplary embodiment, all the lens groups move relatively along optical axis L. Consequently, zooming operation from the wide angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 1.

Figure 15:
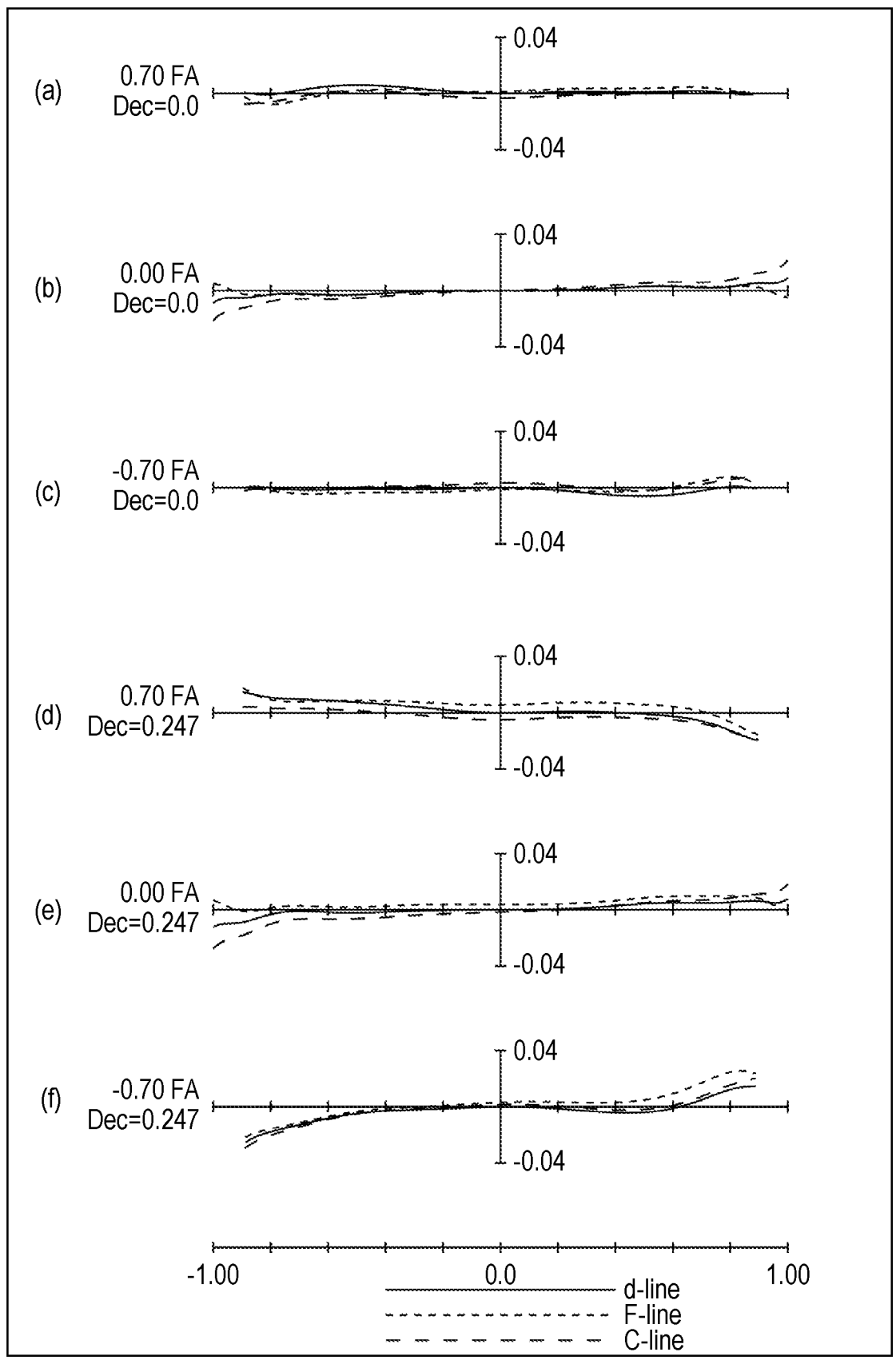
FIG. 15 is a view illustrating a lateral aberration in a basic state in which image blur is not corrected and an image blur correction state at a telephoto end of the imaging optical system of the fifth numerical example.

Twelfth lens L12 of third lens group G3 moves onto the object side along optical axis L, and moves so as to have a component to move in a perpendicular direction of optical axis L. The term "have a component to move in a perpendicular direction" is not limited to the direction orthogonal to optical axis L, but includes a meaning of round movement with respect to the perpendicular direction, for example, along the surface of the lens. The same is applied to the following exemplary embodiments. This enables optical correction of image blur. Specifically, the movement of twelfth lens L12 corrects image point movement caused by vibration of the whole imaging optical system. Resultantly, the image blue due to camera shake or vibration can optically be corrected. Details of the image blur correction will be described later with reference to FIG. 15.

Second Exemplary Embodiment

An imaging optical system according to a second exemplary embodiment will be described below with reference to FIG. 4.

Figure 4:
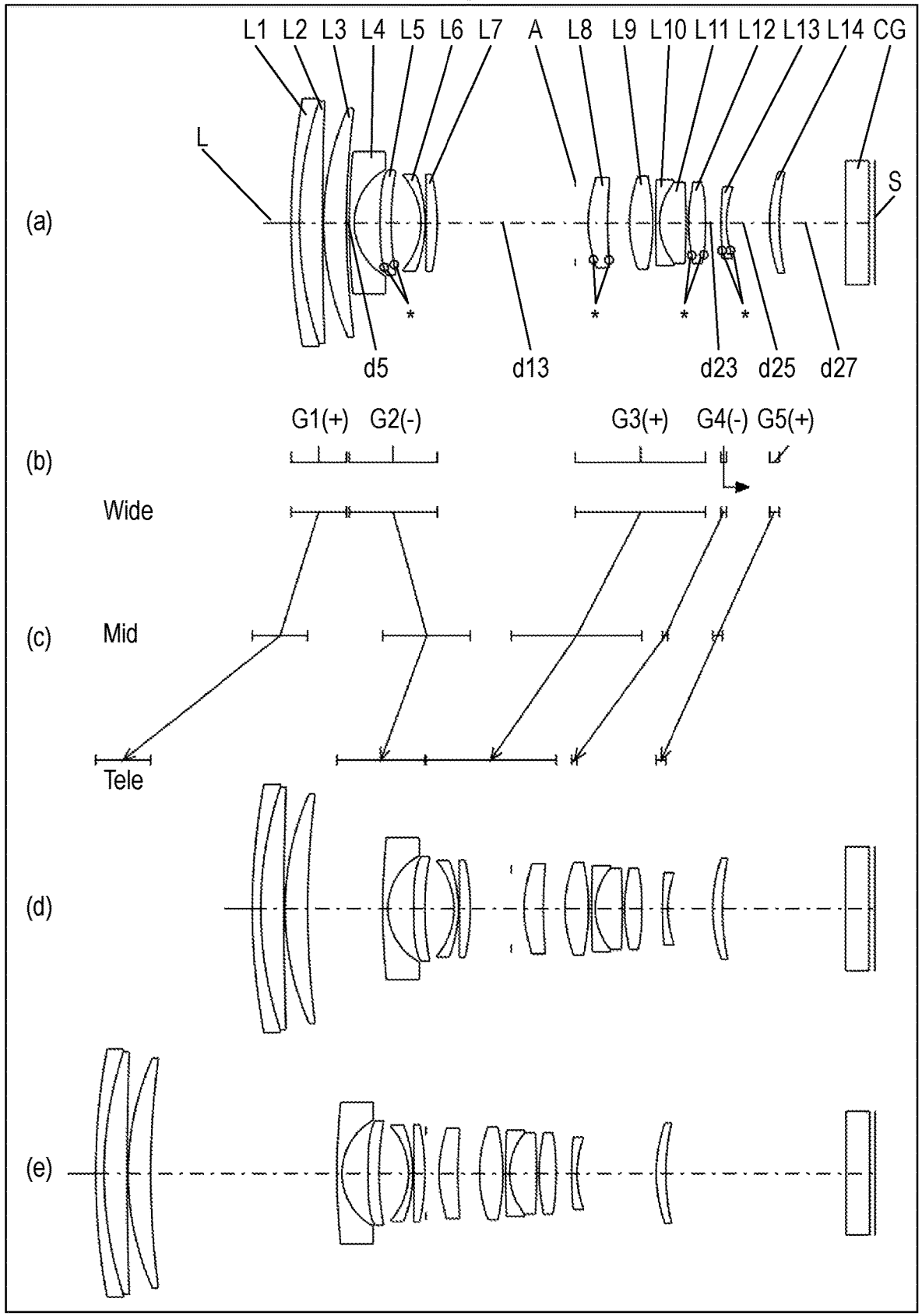
FIG. 4 is a view illustrating lens arrangement in an infinity focusing state of an imaging optical system according to a second exemplary embodiment.
Figure 5:
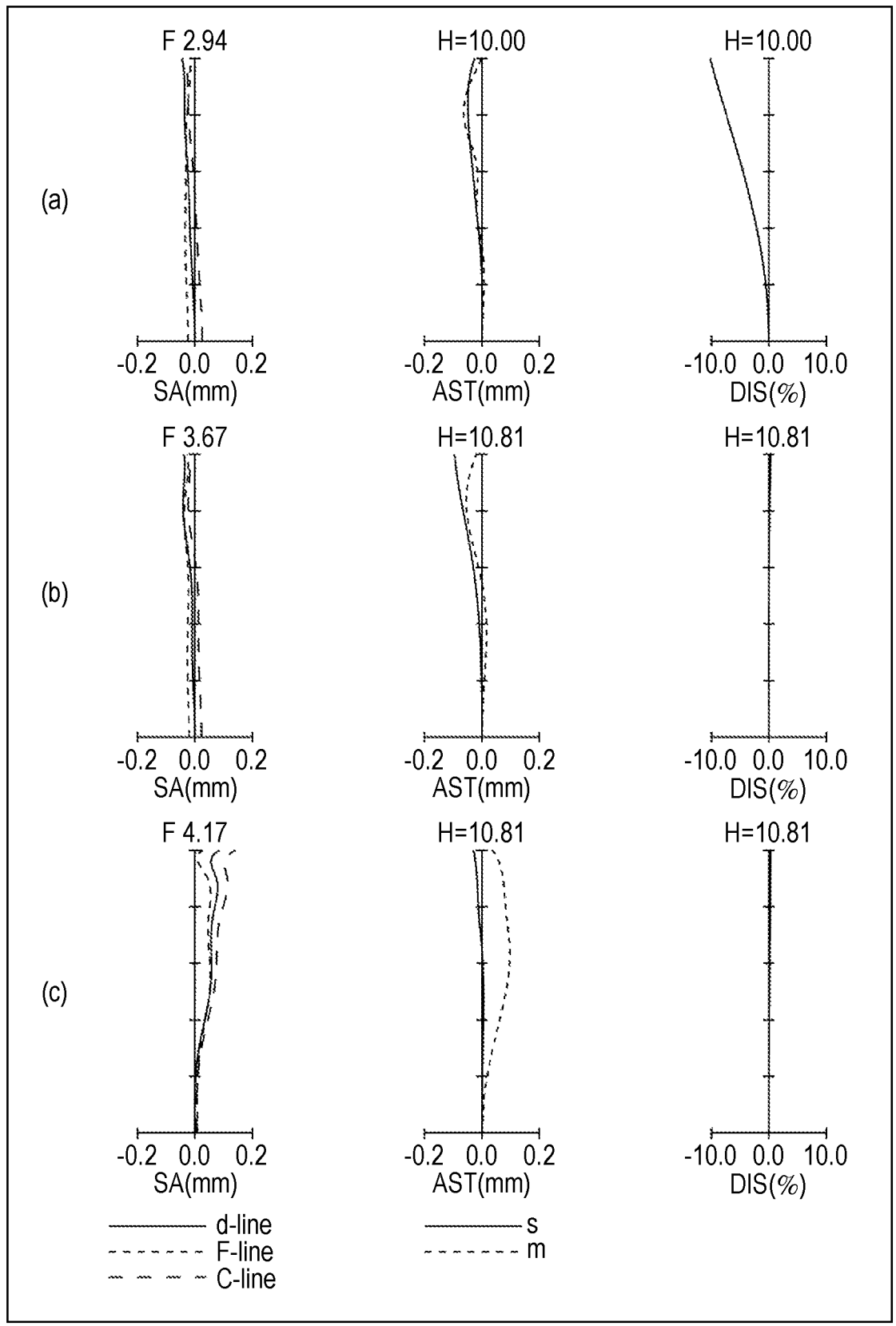
FIG. 5 is a view illustrating a longitudinal aberration in the infinity focusing state of an imaging optical system according to a second numerical example of the second exemplary embodiment.
Figure 6:
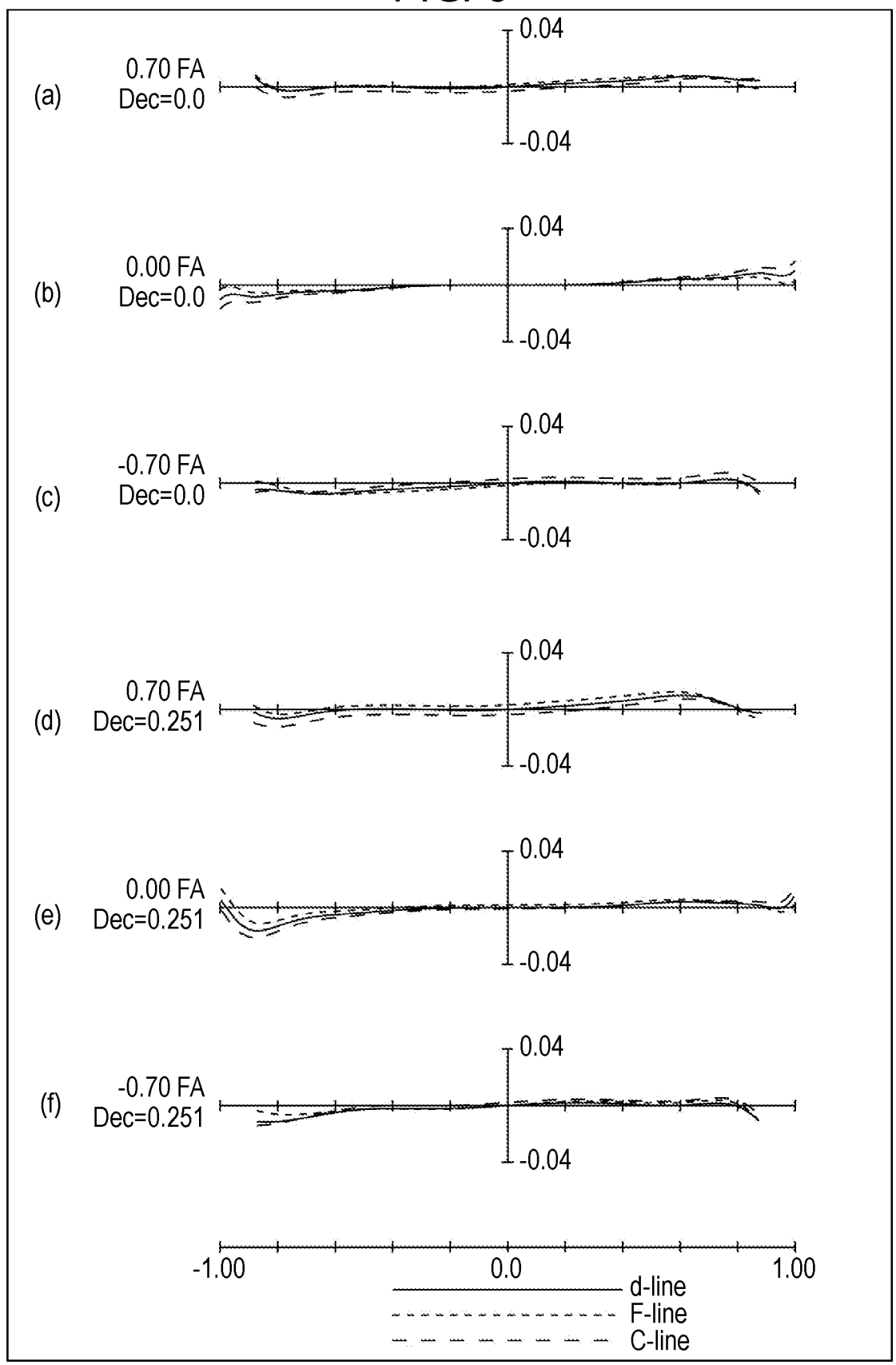
FIG. 6 is a view illustrating a lateral aberration in a basic state in which image blur is not corrected and an image blur correction state at a telephoto end of the imaging optical system of the second numerical example.

FIG. 4 illustrates the lens arrangement of the imaging optical system according to the second exemplary embodiment and operation of the imaging optical system.

As illustrated in FIG. 4, the imaging optical system of the second exemplary embodiment includes first lens group G1 having positive power, second lens group G2 having negative power, aperture diaphragm A, third lens group G3 having the positive power, a succeeding lens group including one or more lens groups, and parallel plate CG in order from the object side toward the image side. For example, the succeeding lens group includes fourth lens group G4 having the negative power and fifth lens group G5 having the positive power.

First lens group G1 includes first lens L1 having the negative power, second lens L2 having the positive power, and third lens L3 having the positive power in order from the object side toward the image side. First lens L1 and second lens L2 are constructed with a cemented lens that is bonded using an adhesive such as ultraviolet curing resin.

Second lens group G2 includes fourth lens L4 having the negative power, fifth lens L5 having the negative power, sixth lens L6 having the negative power, and seventh lens L7 having the positive power in order from the object side toward the image side. Fourth lens L4 is exemplified by lens L2F1. Fifth lens L5 is exemplified by lens L2F2 and lens L2R3. Sixth lens L6 is exemplified by lens L2R2. Seventh lens L7 is exemplified by lens L2R1.

Third lens group G3 includes eighth lens L8 having the positive power, ninth lens L9 having the positive power, tenth lens L10 having the negative power, eleventh lens L11 having the positive power, and twelfth lens L12 having the positive power in order from the object side toward the image side. Tenth lens L10 and eleventh lens L11 are constructed with a cemented lens that is bonded using an adhesive such as ultraviolet curing resin. Eighth lens L8 is exemplified by lens L3F1. Ninth lens L9 is exemplified by lens L3F2. Tenth lens L10 is exemplified by lens L3R3. Eleventh lens L11 is exemplified by lens L3R2. Twelfth lens L12 is exemplified by lens L3R1.

Fourth lens group G4 includes thirteenth lens L13 having the negative power.

Fifth lens group G5 includes fourteenth lens L14 having the positive power.

Aperture diaphragm A is disposed between seventh lens L7 of second lens group G2 and eighth lens L8 of third lens group G3.

The lens constituting each lens group of the imaging optical system of the second exemplary embodiment will be described below.

First, each lens in first lens group G1 will be described.

First lens L1 is a meniscus lens having a convex surface on the object side. Second lens L2 is a meniscus lens having the convex surface on the object side. Third lens L3 is a meniscus lens having the convex surface on the object side.

Then, each lens in second lens group G2 will be described.

Fourth lens L4 is a meniscus lens having the convex surface on the object side. Fifth lens L5 is a meniscus lens having the convex surface on the object side. Both surfaces of fifth lens L5 are aspherical surfaces. Sixth lens L6 is a meniscus lens having a concave surface on the object side. Seventh lens L7 is a meniscus lens having a concave surface on the object side.

Then, each lens in third lens group G3 will be described.

Eighth lens L8 is a meniscus lens having the convex surface on the object side. Both surfaces of eighth lens L8 are aspherical surfaces. Ninth lens L9 is a biconvex lens. Tenth lens L10 is a meniscus lens having the convex surface on the object side. Eleventh lens L11 is a biconvex lens. Twelfth lens L12 is a biconvex lens. Both surfaces of twelfth lens L12 are aspherical surfaces.

Then, each lens in fourth lens group G4 will be described.

Thirteenth lens L13 is a meniscus lens having the convex surface on the object side. Both surfaces of thirteenth lens L13 are aspherical surfaces.

Then, each lens in fifth lens group G5 will be described.

Fourteenth lens L14 is a meniscus lens having the convex surface on the object side.

As described above, the imaging optical system of the second exemplary embodiment having the above configuration includes five lens groups.

Each lens group of the imaging optical system of the second exemplary embodiment moves as indicated by the arrow in part (c) of FIG. 4 during the zooming from the wide angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide angle end to the intermediate position, and decreases from the intermediate position to the telephoto end. The distance between fourth lens group G4 and fifth lens group G5 increases. The distance between fifth lens group G5 and image surface S increases. During the zooming from the wide angle end to the telephoto end, the open aperture diameter of aperture diaphragm A is identical from the wide angle end to the intermediate position, and increases at the telephoto end compared with the intermediate position.

As described above, each lens group moves along optical axis L as indicated by the arrow in part (c) of FIG. 4. As illustrated in parts (a), (d), (e) of FIG. 4, each lens group is disposed at the wide angle end, the intermediate position, and the telephoto end.

That is, in the imaging optical system of the second exemplary embodiment, all the lens groups move relatively along optical axis L. Consequently, zooming operation from the wide angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 4.

Twelfth lens L12 of third lens group G3 moves onto the object side along optical axis L, and moves in the direction perpendicular to optical axis L. This enables optical correction of image blur. Specifically, the movement of twelfth lens L12 corrects image point movement caused by vibration of the whole imaging optical system. Resultantly, the image blue due to camera shake or vibration can optically be corrected.

Third Exemplary Embodiment

An imaging optical system according to a third exemplary embodiment will be described below with reference to FIG. 7.

Figure 7:
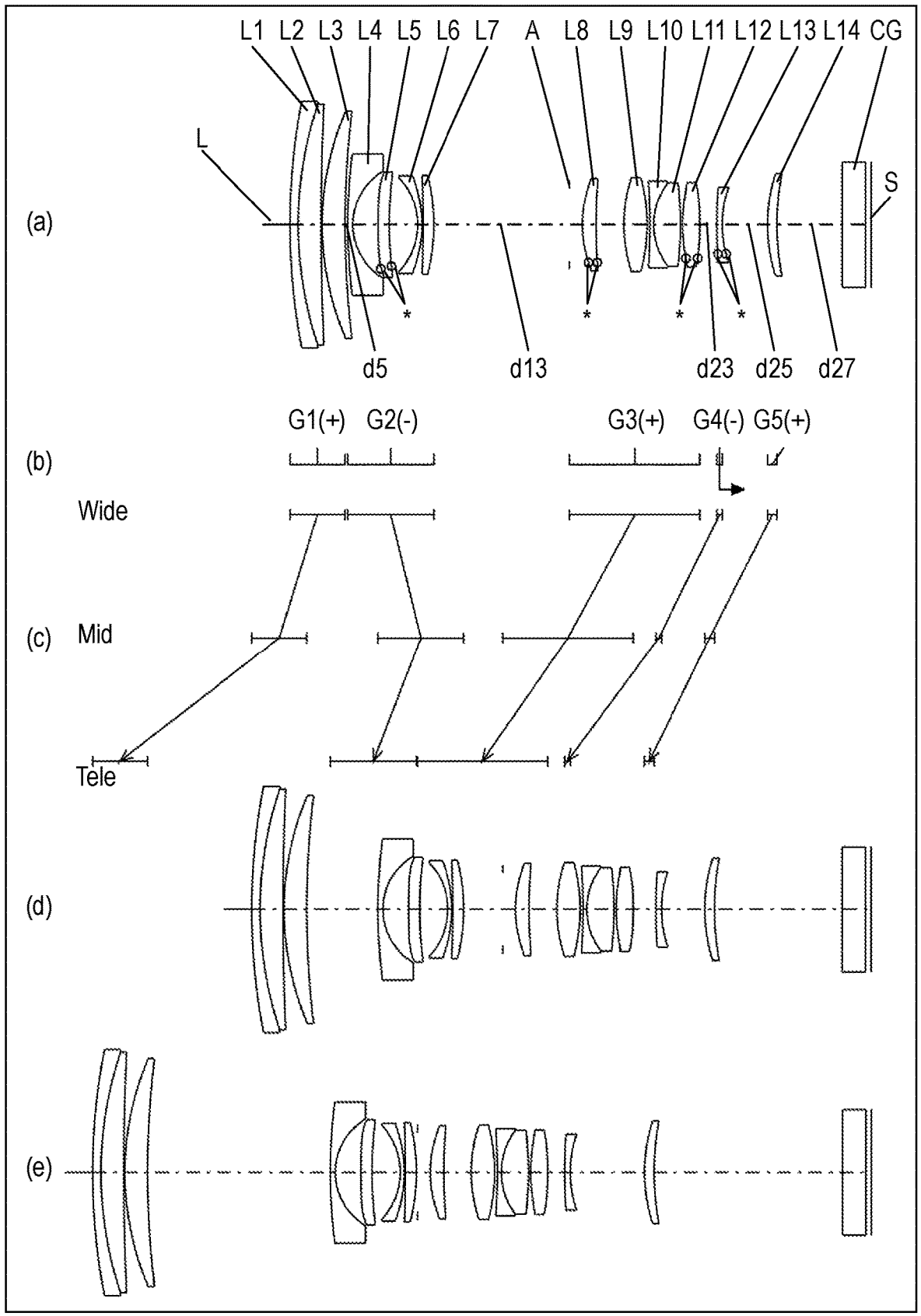
FIG. 7 is a view illustrating lens arrangement in an infinity focusing state of an imaging optical system according to a third exemplary embodiment.
Figure 8:
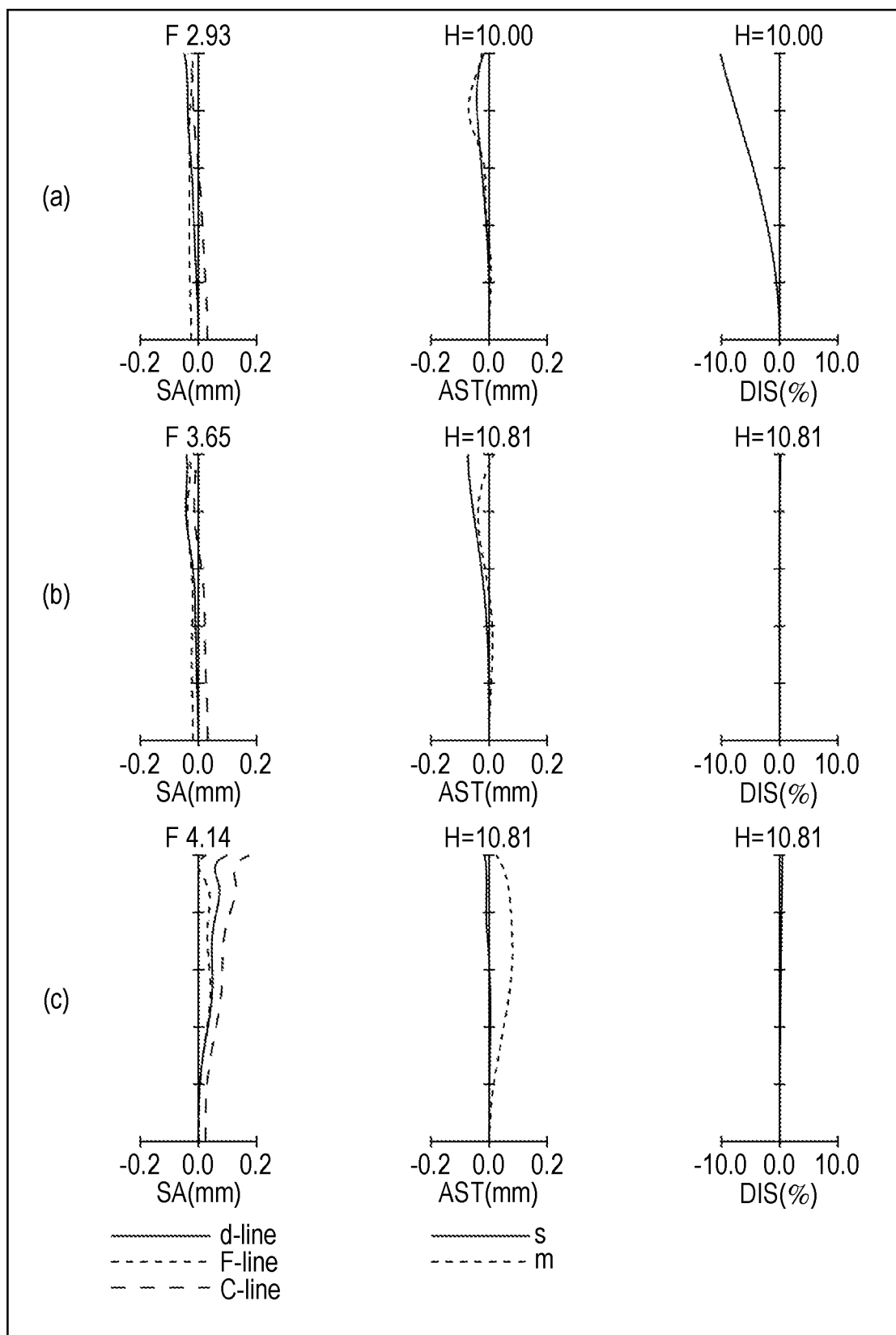
FIG. 8 is a view illustrating a longitudinal aberration in the infinity focusing state of an imaging optical system according to a third numerical example of the third exemplary embodiment.
Figure 9:
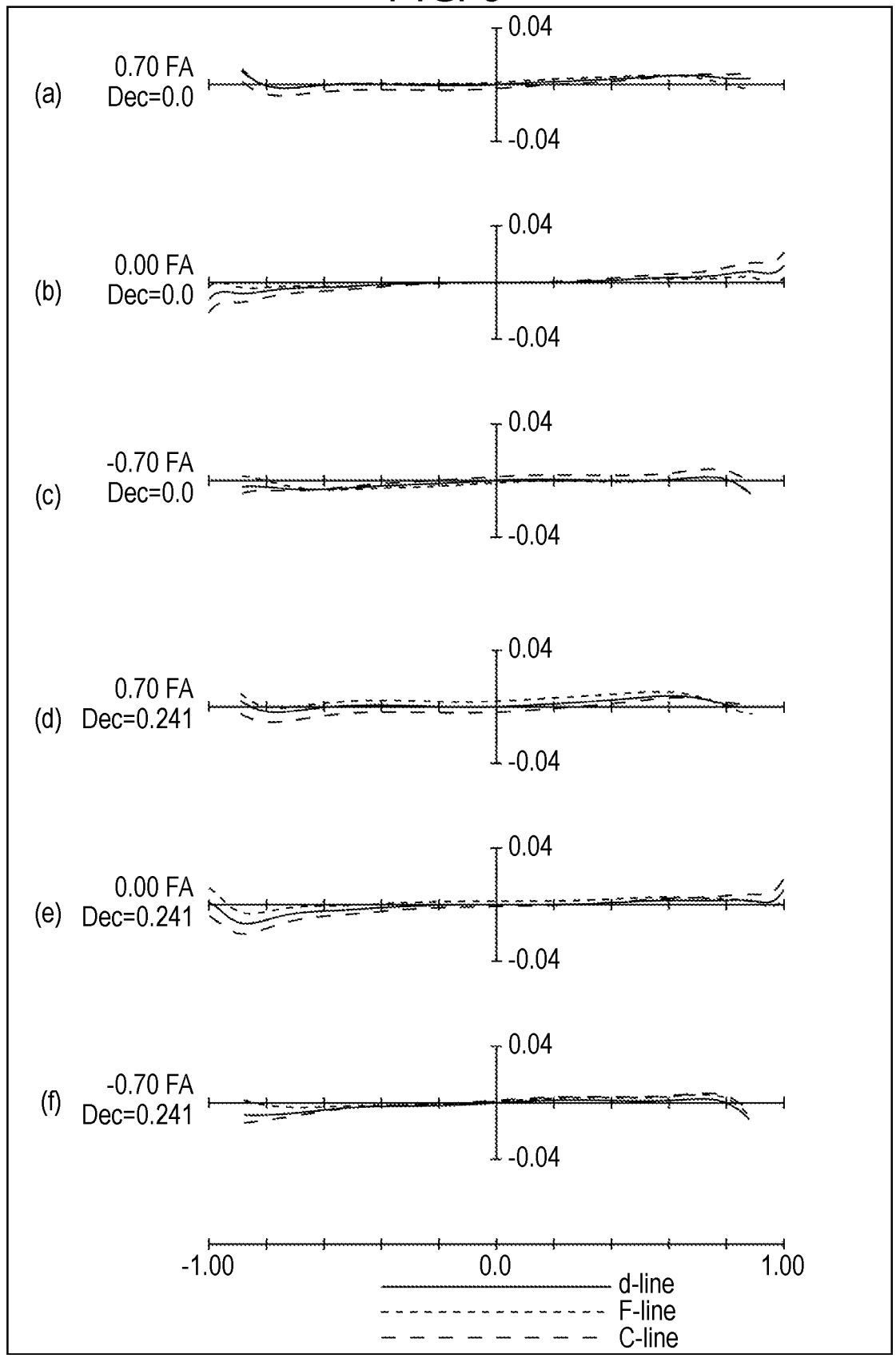
FIG. 9 is a view illustrating a lateral aberration in a basic state in which image blur is not corrected and an image blur correction state at a telephoto end of the imaging optical system of the third numerical example.

FIG. 7 illustrates the lens arrangement of the imaging optical system of the third exemplary embodiment and operation of the imaging optical system.

As illustrated in FIG. 7, the imaging optical system of the third exemplary embodiment includes first lens group G1 having positive power, second lens group G2 having negative power, aperture diaphragm A, third lens group G3 having the positive power, a succeeding lens group including one or more lens groups, and parallel plate CG in order from the object side toward the image side. For example, the succeeding lens group includes fourth lens group G4 having the negative power and fifth lens group G5 having the positive power.

First lens group G1 includes first lens L1 having the negative power, second lens L2 having the positive power, and third lens L3 having the positive power in order from the object side toward the image side. First lens L1 and second lens L2 are constructed with a cemented lens that is bonded using an adhesive such as ultraviolet curing resin.

Second lens group G2 includes fourth lens L4 having the negative power, fifth lens L5 having the negative power, sixth lens L6 having the negative power, and seventh lens L7 having the positive power in order from the object side toward the image side. Fourth lens L4 is exemplified by lens L2F1. Fifth lens L5 is exemplified by lens L2F2 and lens L2R3. Sixth lens L6 is exemplified by lens L2R2. Seventh lens L7 is exemplified by lens L2R1.

Third lens group G3 includes eighth lens L8 having the positive power, ninth lens L9 having the positive power, tenth lens L10 having the negative power, eleventh lens L11 having the positive power, and twelfth lens L12 having the positive power in order from the object side toward the image side. Tenth lens L10 and eleventh lens L11 are constructed with a cemented lens that is bonded using an adhesive such as ultraviolet curing resin. Eighth lens L8 is exemplified by lens L3F1. Ninth lens L9 is exemplified by lens L3F2. Tenth lens L10 is exemplified by lens L3R3. Eleventh lens L11 is exemplified by lens L3R2. Twelfth lens L12 is exemplified by lens L3R1.

Fourth lens group G4 includes thirteenth lens L13 having the negative power.

Fifth lens group G5 includes fourteenth lens L14 having the positive power.

Aperture diaphragm A is disposed between seventh lens L7 of second lens group G2 and eighth lens L8 of third lens group G3.

The lens constituting each lens group of the imaging optical system of the third exemplary embodiment will be described below.

First, each lens in first lens group G1 will be described.

First lens L1 is a meniscus lens having a convex surface on the object side. Second lens L2 is a meniscus lens having the convex surface on the object side. Third lens L3 is a meniscus lens having the convex surface on the object side.

Then, each lens in second lens group G2 will be described.

Fourth lens L4 is a meniscus lens having the convex surface on the object side. Fifth lens L5 is a meniscus lens having the convex surface on the object side. Both surfaces of fifth lens L5 are aspherical surfaces. Sixth lens L6 is a meniscus lens having a concave surface on the object side. Seventh lens L7 is a meniscus lens having a concave surface on the object side.

Then, each lens in third lens group G3 will be described.

Eighth lens L8 is a meniscus lens having the convex surface on the object side. Both surfaces of eighth lens L8 are aspherical surfaces. Ninth lens L9 is a biconvex lens. Tenth lens L10 is a biconcave lens. Eleventh lens L11 is a biconvex lens. Twelfth lens L12 is a biconvex lens. Both surfaces of twelfth lens L12 are aspherical surfaces.

Then, each lens in fourth lens group G4 will be described.

Thirteenth lens L13 is a meniscus lens having the convex surface on the object side. Both surfaces of thirteenth lens L13 are aspherical surfaces.

Then, each lens in fifth lens group G5 will be described.

Fourteenth lens L14 is a meniscus lens having the convex surface on the object side.

As described above, the imaging optical system of the third exemplary embodiment having the above configuration includes five lens groups.

Each lens group of the imaging optical system of the third exemplary embodiment moves as indicated by the arrow in part (c) of FIG. 7 during the zooming from the wide angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide angle end to the intermediate position, and decreases from the intermediate position to the telephoto end. The distance between fourth lens group G4 and fifth lens group G5 decreases from the wide angle end to the intermediate position, and increases from the intermediate position to the telephoto end. The distance between fifth lens group G5 and image surface S increases. During the zooming from the wide angle end to the telephoto end, the open aperture diameter of aperture diaphragm A is identical from the wide angle end to the intermediate position, and increases at the telephoto end compared with the intermediate position.

As described above, each lens group moves along optical axis L as indicated by the arrow in part (c) of FIG. 7. As illustrated in parts (a), (d), (e) of FIG. 7, each lens group is disposed at the wide angle end, the intermediate position, and the telephoto end.

That is, in the imaging optical system of the third exemplary embodiment, all the lens groups move relatively along optical axis L. Consequently, zooming operation from the wide angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 7.

Twelfth lens L12 of third lens group G3 moves onto the object side along optical axis L, and moves in the direction perpendicular to optical axis L. This enables optical correction of image blur. Specifically, the movement of twelfth lens L12 corrects image point movement caused by vibration of the whole imaging optical system. Resultantly, the image blue due to camera shake or vibration can optically be corrected.

Fourth Exemplary Embodiment

An imaging optical system according to a fourth exemplary embodiment will be described below with reference to FIG. 10.

Figure 10:
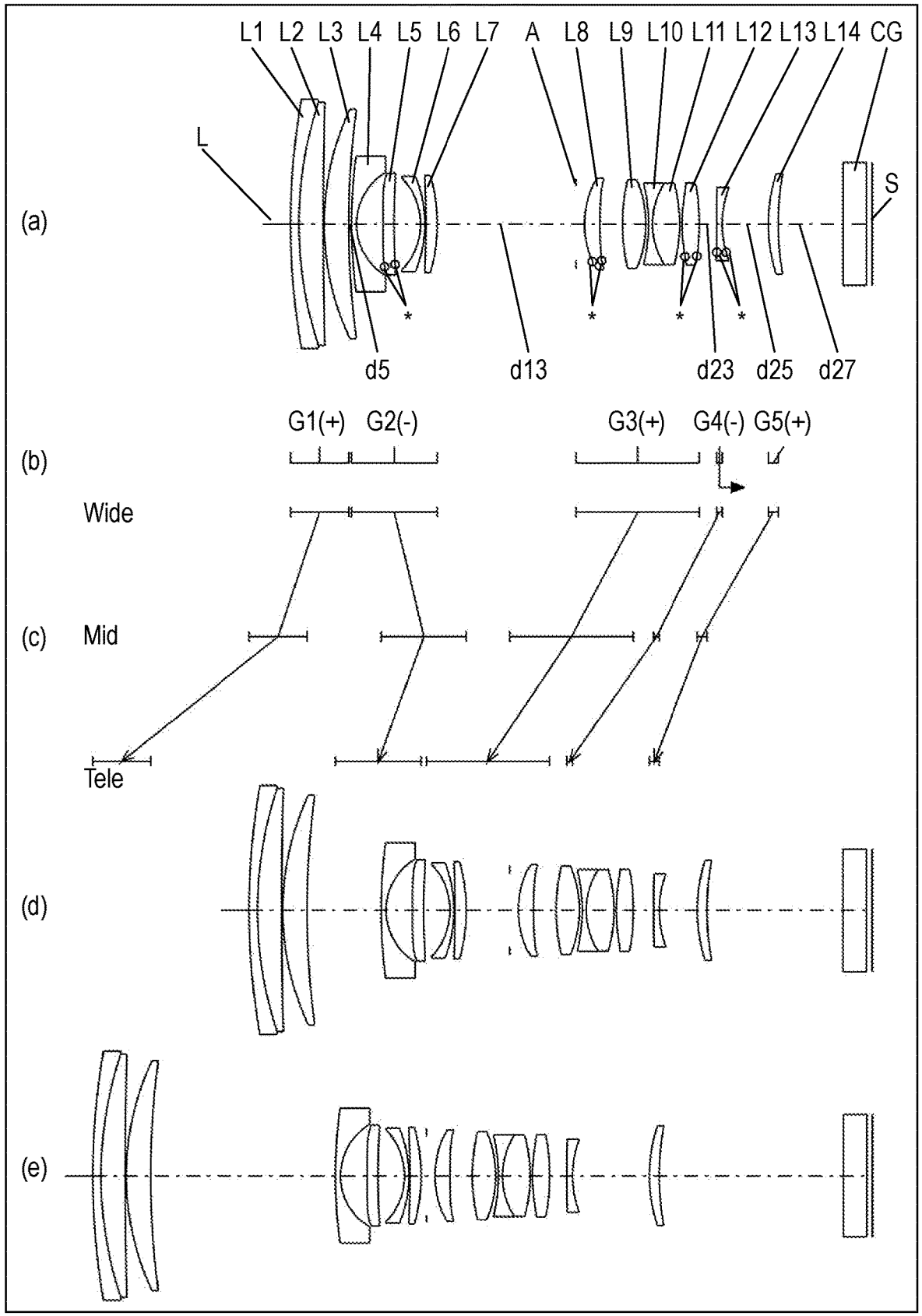
FIG. 10 is a view illustrating lens arrangement in an infinity focusing state of an imaging optical system according to a fourth exemplary embodiment.
Figure 11:
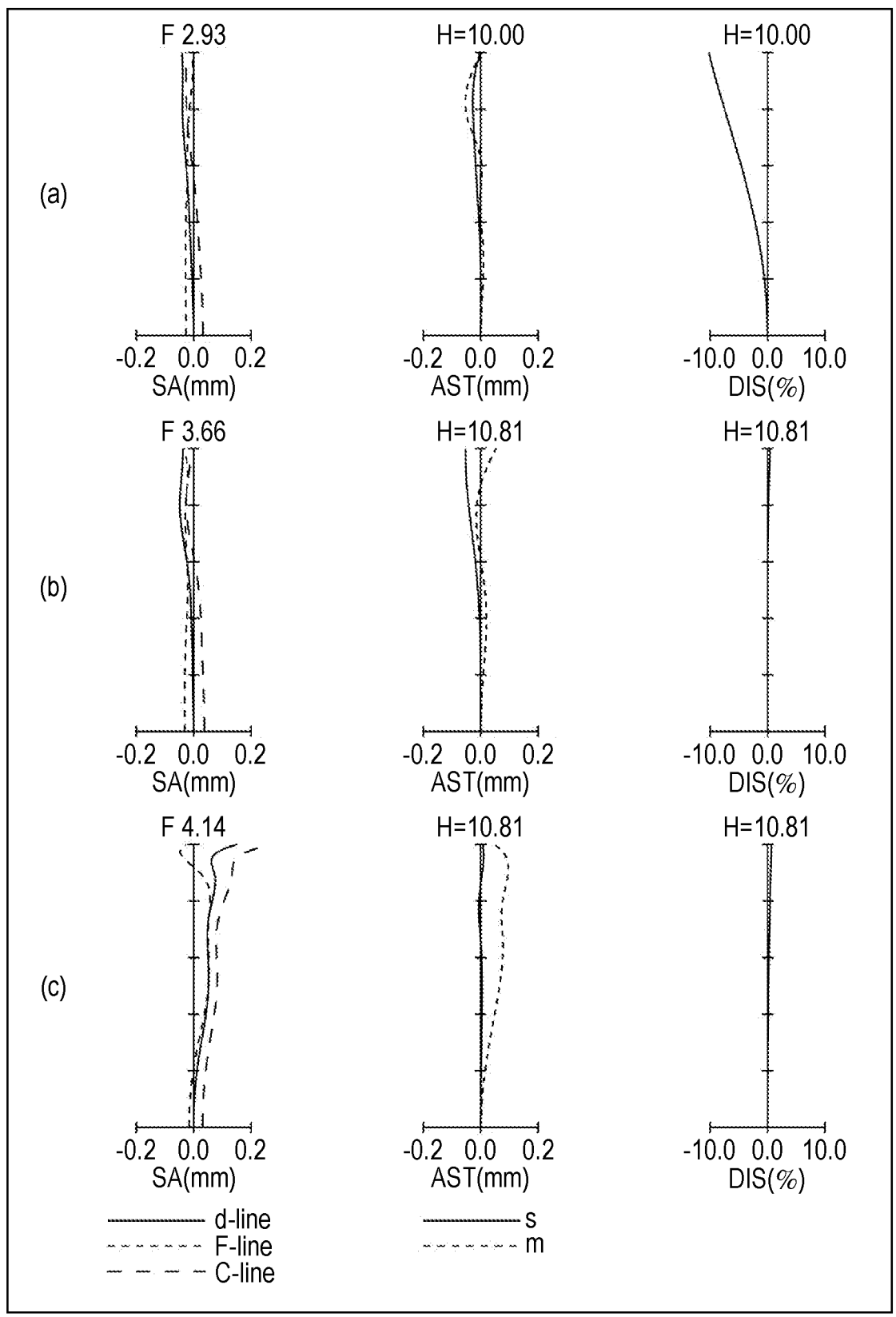
FIG. 11 is a view illustrating a longitudinal aberration in the infinity focusing state of an imaging optical system according to a fourth numerical example of the fourth exemplary embodiment.
Figure 12:
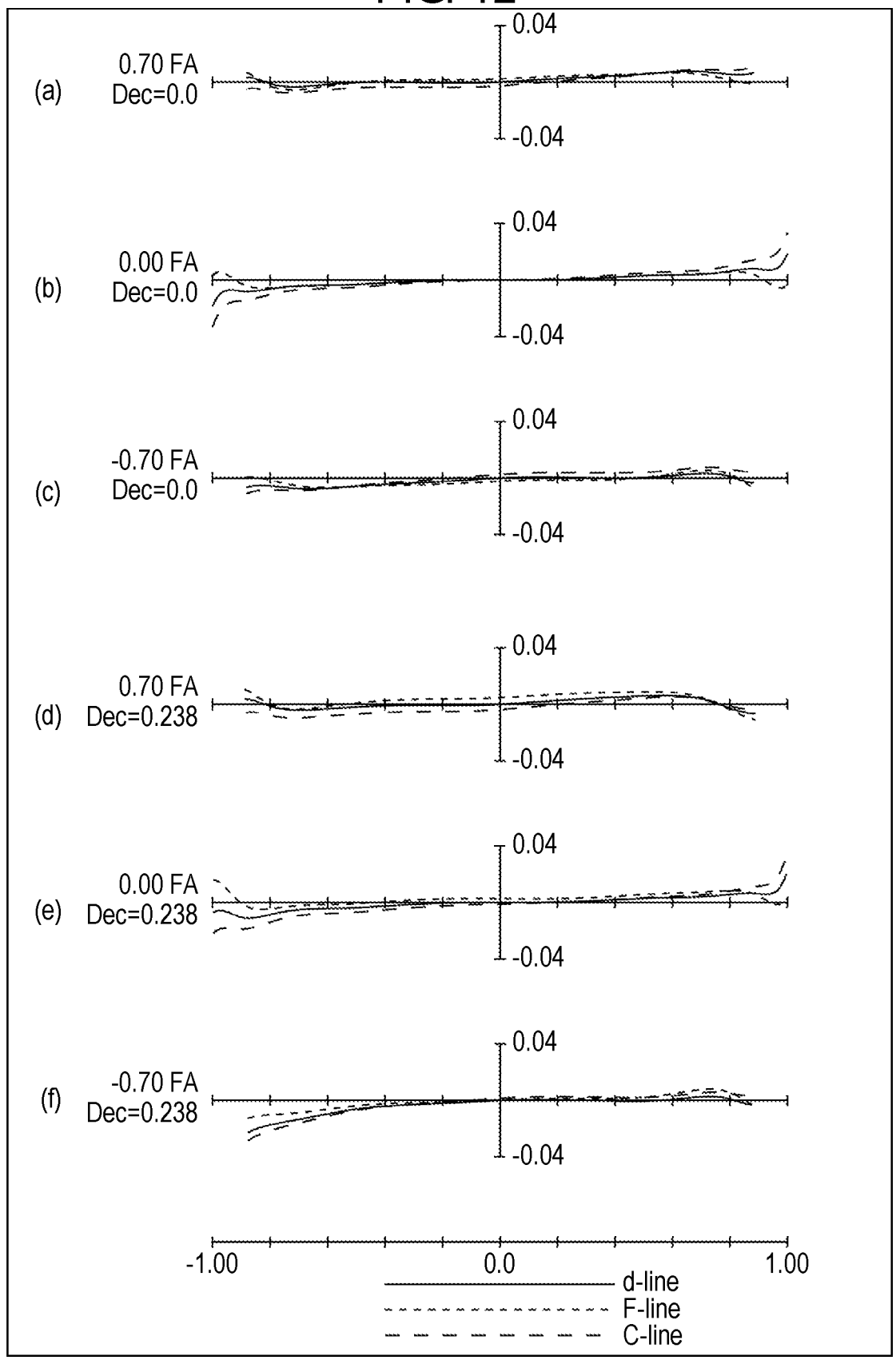
FIG. 12 is a view illustrating a lateral aberration in a basic state in which image blur is not corrected and an image blur correction state at a telephoto end of the imaging optical system of the fourth numerical example.

FIG. 10 illustrates the lens arrangement of the imaging optical system of the fourth exemplary embodiment and operation of the imaging optical system.

As illustrated in FIG. 10, the imaging optical system of the fourth exemplary embodiment includes first lens group G1 having positive power, second lens group G2 having negative power, aperture diaphragm A, third lens group G3 having the positive power, a succeeding lens group including one or more lens groups, and parallel plate CG in order from the object side toward the image side. For example, the succeeding lens group include fourth lens group G4 having the negative power and fifth lens group G5 having the positive power.

First lens group G1 includes first lens L1 having the negative power, second lens L2 having the positive power, and third lens L3 having the positive power in order from the object side toward the image side. First lens L1 and second lens L2 are constructed with a cemented lens that is bonded using an adhesive such as ultraviolet curing resin.

Second lens group G2 includes fourth lens L4 having the negative power, fifth lens L5 having the negative power, sixth lens L6 having the negative power, and seventh lens L7 having the positive power in order from the object side toward the image side. Fourth lens L4 is exemplified by lens L2F1. Fifth lens L5 is exemplified by lens L2F2 and lens L2R3. Sixth lens L6 is exemplified by lens L2R2. Seventh lens L7 is exemplified by lens L2R1.

Third lens group G3 includes eighth lens L8 having the positive power, ninth lens L9 having the positive power, tenth lens L10 having the negative power, eleventh lens L11 having the positive power, and twelfth lens L12 having the positive power in order from the object side toward the image side. Tenth lens L10 and eleventh lens L11 are constructed with a cemented lens that is bonded using an adhesive such as ultraviolet curing resin. Eighth lens L8 is exemplified by lens L3F1. Ninth lens L9 is exemplified by lens L3F2. Tenth lens L10 is exemplified by lens L3R3. Eleventh lens L11 is exemplified by lens L3R2. Twelfth lens L12 is exemplified by lens L3R1.

Fourth lens group G4 includes thirteenth lens L13 having the negative power.

Fifth lens group G5 includes fourteenth lens L14 having the positive power.

Aperture diaphragm A is disposed between seventh lens L7 of second lens group G2 and eighth lens L8 of third lens group G3.

The lens constituting each lens group of the imaging optical system of the fourth exemplary embodiment will be described below.

First, each lens in first lens group G1 will be described.

First lens L1 is a meniscus lens having a convex surface on the object side. Second lens L2 is a meniscus lens having the convex surface on the object side. Third lens L3 is a meniscus lens having the convex surface on the object side.

Then, each lens in second lens group G2 will be described.

Fourth lens L4 is a meniscus lens having the convex surface on the object side. Fifth lens L5 is a biconcave lens.

Both surfaces of fifth lens L5 are aspherical surfaces. Sixth lens L6 is a meniscus lens having a concave surface on the object side. Seventh lens L7 is a meniscus lens having a concave surface on the object side.

Then, each lens in third lens group G3 will be described.

Eighth lens L8 is a meniscus lens having the convex surface on the object side. Both surfaces of eighth lens L8 are aspherical surfaces. Ninth lens L9 is a biconvex lens. Tenth lens L10 is a biconcave lens. Eleventh lens L11 is a biconvex lens. Twelfth lens L12 is a biconvex lens. Both surfaces of twelfth lens L12 are aspherical surfaces.

Then, each lens in fourth lens group G4 will be described.

Thirteenth lens L13 is a biconcave lens, and both surfaces of thirteenth lens L13 are aspherical surfaces.

Then, each lens in fifth lens group G5 will be described.

Fourteenth lens L14 is a meniscus lens having the convex surface on the object side.

As described above, the imaging optical system of the fourth exemplary embodiment having the above configuration includes five lens groups.

Each lens group of the imaging optical system of the fourth exemplary embodiment moves as indicated by the arrow in part (c) of FIG. 10 during the zooming from the wide angle end to the telephoto end in imaging.

Specifically, first lens group G1 moves onto the object side, and second lens group G2 moves onto the side of the image surface so as to draw a convex locus. Aperture diaphragm A and third lens group G3 move integrally onto the object side. Fourth lens group G4 moves onto the object side, and fifth lens group G5 moves onto the object side. During the zooming, this movement increases a distance between first lens group G1 and second lens group G2, and decreases a distance between second lens group G2 and third lens group G3. The distance between third lens group G3 and fourth lens group G4 increases from the wide angle end to the intermediate position, and decreases from the intermediate position to the telephoto end. The distance between fourth lens group G4 and fifth lens group G5 increases. The distance between fifth lens group G5 and image surface S increases. During the zooming from the wide angle end to the telephoto end, the open aperture diameter of aperture diaphragm A is identical from the wide angle end to the intermediate position, and increases at the telephoto end compared with the intermediate position.

As described above, each lens group moves along optical axis L as indicated by the arrow in part (c) of FIG. 10. As illustrated in parts (a), (d), (e) of FIG. 10, each lens group is disposed at the wide angle end, the intermediate position, and the telephoto end.

That is, in the imaging optical system of the fourth exemplary embodiment, all the lens groups move relatively along optical axis L. Consequently, zooming operation from the wide angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 10.

Twelfth lens L12 of third lens group G3 moves onto the object side along optical axis L, and moves so as to have a component to move in a perpendicular direction of optical axis L. This enables optical correction of image blur. Specifically, the movement of twelfth lens L12 corrects image point movement caused by vibration of the whole imaging optical system. Resultantly, the image blue due to camera shake or vibration can optically be corrected.

Fifth Exemplary Embodiment

An imaging optical system according to a fifth exemplary embodiment will be described below with reference to FIG. 13.

Figure 13:
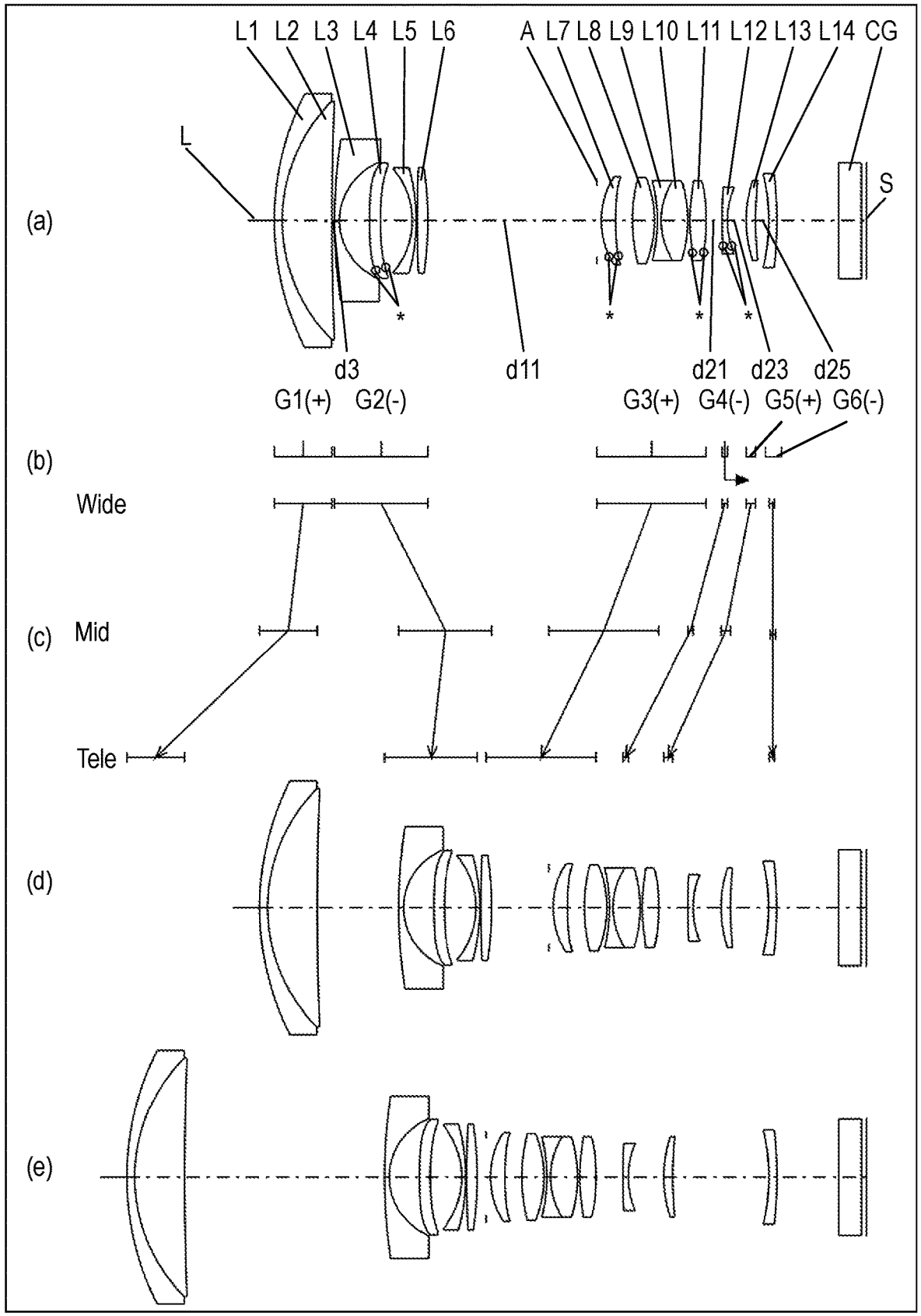
FIG. 13 is a view illustrating lens arrangement in an infinity focusing state of an imaging optical system according to a fifth exemplary embodiment.
Figure 14:
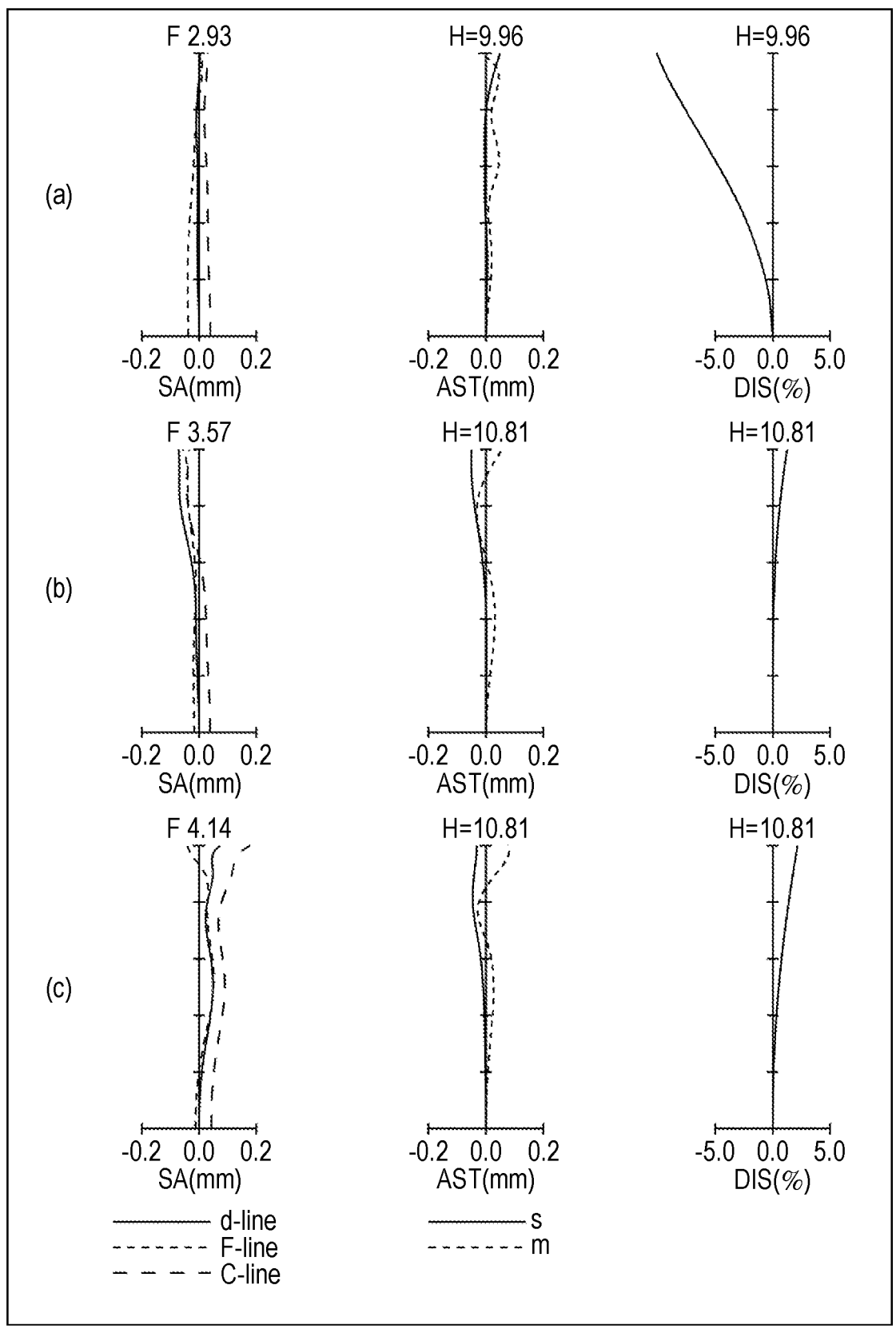
FIG. 14 is a view illustrating a longitudinal aberration in the infinity focusing state of an imaging optical system according to a fifth numerical example of the fifth exemplary embodiment.

FIG. 13 illustrates the lens arrangement of the imaging optical system of the fifth exemplary embodiment and operation of the imaging optical system.

As illustrated in FIG. 13, the imaging optical system of the fifth exemplary embodiment includes first lens group G1 having positive power, second lens group G2 having negative power, aperture diaphragm A, third lens group G3 having the positive power, fourth lens group G4 having the negative power, fifth lens group G5 having the positive power, sixth lens group G6 having the negative power, and parallel plate CG.

First lens group G1 includes first lens L1 having the negative power and second lens L2 having the positive power in order from the object side toward the image side. First lens L1 and second lens L2 are constructed with a cemented lens that is bonded using an adhesive such as ultraviolet curing resin.

Second lens group G2 includes third lens L3 having the negative power, fourth lens L4 having the negative power, fifth lens L5 having the negative power, and sixth lens L6 having the positive power in order from the object side toward the image side. Third lens L3 is exemplified by lens L2F1. Fourth lens L4 is exemplified by lens L2F2 and lens L2R3. Fifth lens L5 is exemplified by lens L2R2. Sixth lens L6 is exemplified by lens L2R1.

Third lens group G3 includes seventh lens L7 having the positive power, eighth lens L8 having the positive power, ninth lens L9 having the negative power, tenth lens L10 having the positive power, and eleventh lens L11 having the positive power in order from the object side toward the image side. Ninth lens L9 and tenth lens L10 are constructed with a cemented lens that is bonded using an adhesive such as ultraviolet curing resin. Seventh lens L7 is exemplified by lens L3F1. Eighth lens L8 is exemplified by lens L3F2. Ninth lens L9 is exemplified by lens L3R3. Tenth lens L10 is exemplified by lens L3R2. Eleventh lens L11 is exemplified by lens L3R1.

Fourth lens group G4 includes twelfth lens L12 having the negative power.

Fifth lens group G5 includes thirteenth lens L13 having the positive power.

Sixth lens group G6 includes fourteenth lens L14 having the negative power.

Aperture diaphragm A is disposed between sixth lens L6 of second lens group G2 and seventh lens L7 of third lens group G3.

The lens constituting each lens group of the imaging optical system of the fifth exemplary embodiment will be described below.

First, each lens in first lens group G1 will be described.

First lens L1 is a meniscus lens having a convex surface on the object side. Second lens L2 is a meniscus lens having the convex surface on the object side.

Then, each lens in second lens group G2 will be described.

Third lens L3 is a meniscus lens having the convex surface on the object side. Fourth lens L4 is a meniscus lens having the convex surface on the object side. Both surfaces of fourth lens L4 are aspherical surfaces. Fifth lens L5 is a meniscus lens having the concave surface on the object side. Sixth lens L6 is a biconvex lens.

Then, each lens in third lens group G3 will be described.

Seventh lens L7 is a meniscus lens having the convex surface on the object side. Both surfaces of seventh lens L7 are aspherical surfaces. Eighth lens L8 is a biconvex lens. Ninth lens L9 is a biconcave lens. Tenth lens L10 is a biconvex lens. Eleventh lens L11 is a biconvex lens. Both surfaces of eleventh lens L11 are aspherical surfaces.

Then, each lens in fourth lens group G4 will be described.

Twelfth lens L12 is a meniscus lens having the convex surface on the object side. Both surfaces of twelfth lens L12 are aspherical surfaces.

Then, the lens in fifth lens group G5 will be described.

Thirteenth lens L13 is a meniscus lens having the convex surface on the object side.

Further, the lens in sixth lens group G6 will be described.

Fourteenth lens L14 is a meniscus lens having the convex surface on the image side.

As described above, the imaging optical system of the fifth exemplary embodiment includes six lens groups.

Each lens group of the imaging optical system of the fifth exemplary embodiment moves as indicated by the arrow in part (c) of FIG. 13 during the zooming from the wide angle end to the telephoto end in imaging.

Specifically, first lens group G1 moves onto the object side, and second lens group G2 moves onto the side of image surface S so as to draw a convex locus. Aperture diaphragm A and third lens group G3 move integrally onto the object side. Fourth lens group G4 moves onto the object side, and fifth lens group G5 moves onto the object side. Sixth lens group G6 does not move. During the zooming, this movement increases a distance between first lens group G1 and second lens group G2, and decreases a distance between second lens group G2 and third lens group G3. The distance between third lens group G3 and fourth lens group G4 increases from the wide angle end to the intermediate position, and decreases at the telephoto end compared with the wide angle end. The distance between fourth lens group G4 and fifth lens group G5 increases. The distance between fifth lens group G5 and sixth lens group G6 increases. During the zooming from the wide angle end to the telephoto end, the open aperture diameter of aperture diaphragm A is identical from the wide angle end to the intermediate position, and increases at the telephoto end compared with the wide angle end.

That is, in the imaging optical system of the fifth exemplary embodiment, first lens group G1 to fifth lens group G5 move along optical axis L such that the distance between sixth lens group G6 and image surface S does not change. Consequently, the zooming operation from the wide angle end to the telephoto end is performed.

During the focusing from the infinity focusing state to the proximity focusing state, fourth lens group G4 constituting the focusing lens group moves onto the image side along optical axis L as indicated by the arrow in part (b) of FIG. 13.

Eleventh lens L11 of third lens group G3 moves onto the object side along optical axis L, and moves so as to have a component to move in a perpendicular direction of optical axis L. This enables optical correction of image blur. Specifically, the movement of eleventh lens L11 corrects the image point movement caused by the vibration of the whole imaging optical system. Resultantly, the image blue due to camera shake or vibration can optically be corrected.

Condition and Effect

A condition that can satisfy the configuration of the imaging optical system of the first to fifth exemplary embodiments will be described below.

A plurality of possible conditions are defined with respect to the imaging optical system of each exemplary embodiment. In this case, the configuration of the imaging optical system satisfying all the conditions is most effective.

Alternatively, by satisfying an individual condition as follows, an imaging optical system exhibiting an effect corresponding to each condition can be obtained.

For example, the imaging optical system of the first to fifth exemplary embodiments includes the first lens group having the positive power, the second lens group having the negative power, the third lens group having the positive power, and the succeeding lens group including one or more lens groups in order from the object side toward the image side. The third lens group includes at least lens L3F1 having the positive power and lens L3F2 having the positive power in order from the object side toward the image side. The third lens group includes lens L3R1 having the positive power, lens L3R2 having the positive power, and lens L3R3 having the negative power in order from the image side toward the object side. One optical surface of the lens L3R2 and one optical surface of the lens L3R3 are bonded to each other. Lens L3R1 moves so as to have the component to move in the direction perpendicular to the optical axis, thereby optically correcting the image blur. During the zooming from the wide angle end to the telephoto end in the imaging, at least the second lens group and the third lens group move in an optical axis direction such that a distance between the second lens group and the third lens group changes.

According to this configuration, generation of an eccentric comatic aberration can be decreased in a bright lens even if lens L3R1 is moved during the image blur correction. That is, in the bright lens, the image blur correction group is disposed at a position away from the diaphragm, which becomes easy to decrease the generation of the eccentric comatic aberration. Consequently, degradation of image performance can be prevented during the image blur correction.

Preferably, the imaging optical system having the above basic configuration satisfies the following condition (1):

$$0.5 < f\_L3F1/fw < 15 \quad (1)$$

where f_L3F1 is a focal distance of lens L3F1 and fw is a focal distance in a whole system at the wide angle end.

That is, the condition (1) defines a relationship between the focal distance of lens L3F1 disposed closest to the object side in third lens group G3 and the focal distance of the whole system at the wide angle end.

When f_L3F1/fw is less than or equal to a lower limit (0.5) of the condition (1), the power of lens L3F1 becomes excessively strong. Thus, the correction of a spherical aberration is short. On the other hand, when f_L3F1/fw is greater than or equal to an upper limit (15) of the condition (1), the focal distance of lens L3F1 becomes excessively long. Thus, the correction of the spherical aberration becomes excessive.

At this point, more preferably, one of the following conditions (1a) and (1b) is satisfied.

$$1.0 < f\_L3F1/fw \quad (1a)$$

$$f\_L3F1/fw < 10 \quad (1b)$$

Consequently, the effect is further improved.

More preferably, one of the following conditions (1c) and (1d) is satisfied.

$$1.5 < f\_L3F1/fw \quad (1c)$$

$$f\_L3F1/fw < 7 \quad (1d)$$

Consequently, the effect is further improved.

For example, preferably, second lens L2R2 from the image side of second lens group G2 has a meniscus shape having a convex surface on the image side. Thus, the excessive spherical aberration can be corrected. When the above shape is adopted with respect to the excessive spherical aberration, the negative spherical aberration can be generated at the position where a light beam diverges toward the side of image surface S. Resultantly, the spherical aberration can be corrected.

For example, second lens group G2 includes lens L2F1 having the negative power and lens L2F2 having the negative power in order from the object side toward the image side, and includes lens L2R1 having the positive power and lens L2R2 having the negative power in order from the image side toward the object side. When second lens group G2 includes lens L2R3, preferably lens L2R3 has the negative power. However, when the second lens group has five lenses, a freedom degree increases significantly. For this reason, the disposition of any one of lenses L2R1, L2R2, L2R3 is not decided even in the wide angle system lens. Consequently, an excessive field curvature at the wide angle end, which is easily caused during the wide angle, is easy to correct. That is, the field curvature that is the aberration in a screen peripheral portion is generated in the lens group having the strongest negative power in the second lens group having the negative power. Consequently, to prevent generation of a field curvature, preferably lens L2R2 includes the lens having the negative power. When lens L2R1 has the positive power, the prevention effect is further enhanced.

Preferably, the imaging optical system having the above basic configuration satisfies the following condition (2):

$$0.5 < TH2\_A/TH2\_B < 1.5 \quad (2)$$

where TH2_A is an air distance between first lens L2F1 from the object side of second lens group G2 and second lens L2F2 from the object side of second lens group G2, and TH2_B is an air distance between second lens L2R2 from the image side of second lens group G2 and third lens L2R3 from the image side of second lens group G2.

That is, the condition (2) defines the air distance between first lens L2F1 and second lens L2F2 from the object side of second lens group G2, and the air distance between second lens L2R2 and third lens L2R3 from the image side of second lens group G2.

When TH2_A/TH2_B is less than or equal to the lower limit (0.5) of the condition (2), a light flux diameter output from second lens group G2 increases. Consequently, the diaphragm diameter becomes excessively large. On the other hand, when TH2_A/TH2_B is greater than or equal to the upper limit (1.5) of the condition (2), a light beam angle output from first lens L2F1 of second lens group G2 increases. Consequently, the optical system on the object side is radially enlarged.

At this point, preferably, one of the following conditions (2a) and (3b) is satisfied.

$$0.7 < TH2\_A/TH2\_B \quad (2a)$$

$$TH2\_A/TH2\_B < 1.3 \quad (2b)$$

Consequently, the effect is further improved.

More preferably, one of the following conditions (2c) and (2d) is satisfied.

$$0.8 < TH2\_A/TH2\_B \quad (2c)$$

$$TH2\_A/TH2\_B < 1.2 \quad (2d)$$

Consequently, the effect is further improved.

Preferably, the imaging optical system having the above basic configuration satisfies the following conditions (3), (4):

$$1.45 < nd\_L2F2 \quad (3)$$

$$35 < vd\_L2F2 \quad (4)$$

where nd_L2F2 is a refractive index of second lens L2F2 from the most object side of second lens group G2, and vd_L2F2 is an Abbe number of second lens L2F2 from the most object side of second lens group G2.

That is, the conditions (3), (4) define the refractive index and Abbe number of second lens L2F2 from the most object side of second lens group G2, respectively.

When nd_L2F2 is less than or equal to the lower limit (1.45) of the condition (3), a curvature radius of the lens becomes excessively small. Consequently, the lens is difficult to produce. When vd_L2F2 is less than or equal to the lower limit (35) of the condition (4), a chromatic aberration of magnification at the wide angle end is difficult to correct. That is, the chromatic aberration of magnification at the wide angle end is generated in the lens on the object side from lens L2F2 having a large light beam height. The chromatic aberration of magnification becomes difficult to correct because chromatic dispersion (=a difference in refraction angle in each wavelength) increases with decreasing value of the condition (4).

At this point, more preferably, one of the following conditions (3a) and (4a) is satisfied.

$$1.48 < nd\_L2F2 \quad (3a)$$

$$38 < vd\_L2F2 \quad (4a)$$

Consequently, the effect is further improved.

Preferably, the imaging optical system having the above basic configuration satisfies the following condition (5):

$$0.05 < TH3\_A/TH3\_3G < 0.5 \quad (5)$$

where TH3_A is an air distance between first lens L3F1 from the object side of third lens group G3 and second lens L3F2 from the object side of third lens group G3, and TH3_3G is a center distance between the lens on the most object side of third lens group G3 and the lens on the most image side of third lens group G3.

That is, the condition (5) defines the air distance between first lens L3F1 from the object side of third lens group G3 and second lens L3F2 from the object side of third lens group G3, and the center distance between the lens on the most object side of third lens group G3 and the lens on the most image side of third lens group G3.

When TH3_A/TH3_3G is less than or equal to the lower limit (0.05) of the condition (5), in particular the image surface in a meridional direction falls down too under. On the other hand, when TH3_A/TH3_3G is greater than or equal to the upper limit (0.5) of the condition (5), the image surface in the meridional direction falls down too over.

At this point, more preferably, one of the following conditions (5a) and (5b) is satisfied.

$$0.07 < TH3\_A/TH3\_3G \quad (5a)$$

$$TH3\_A/TH3\_3G < 0.3 \quad (5b)$$

Consequently, the effect is further improved.

Preferably, the imaging optical system having the above basic configuration satisfies the following condition (6):

$$1.0<f\_G3/fw<7 \quad (6)$$

where f_G3 is a focal distance of third lens group G3 and fw is a focal distance in the whole system at the wide angle end.

That is, the condition (6) defines the relationship between the focal distance of third lens group G3 and the focal distance of the whole system at the wide angle end.

When f_G3/fw is less than or equal to the lower limit (1.0) of the condition (6), the focal distance of third lens group G3 becomes small. Consequently, the aberration becomes difficult to be correct in the whole range. On the other hand, when f_G3/fw is greater than or equal to the upper limit (7) of the condition (6), the focal distance of third lens group G3 becomes large. Consequently, to secure a zoom ratio, a movement amount of third lens group G3 becomes excessively large.

At this point, more preferably, one of the following conditions (6a) and (6b) is satisfied.

$$1.3<f\_G3/fw \quad (6a)$$

$$f\_G3/fw<5 \quad (6b)$$

Consequently, the effect is further improved.

Preferably, the imaging optical system having the above basic configuration satisfies the following conditions (7), (8):

$$1.50<nd\_LG4 \quad (7)$$

$$35<vd\_LG4 \quad (8)$$

where nd_LG4 is a refractive index of the lens constituting fourth lens group G4, and vd_LG4 is an Abbe number of the lens constituting fourth lens group G4.

That is, the conditions (7), (8) define the refractive index and Abbe number of the lens constituting fourth lens group G4, respectively.

When nd_LG4 is less than or equal to the lower limit (1.50) of the condition (7), a variation in field curvature becomes large during proximity. That is, at the position of the focusing lens, the light incident on the screen peripheral portion is largely bent with decreasing refractive index, and thus, the focusing lens is usually designed such that the field curvature on a long distance side is reduced. Consequently, the variation in field curvature during the proximity becomes large by a side effect. When vd_LG4 is less than or equal to the lower limit (35) of the condition (8), the chromatic aberration of magnification during the proximity is difficult to correct. That is, at the position of the focusing lens, a variation in wavelength of the light incident on the screen peripheral portion becomes large with decreasing Abbe number, and thus, the focusing lens is usually designed such that the variation in wavelength on the long distance side is reduced. Consequently, the chromatic aberration during the proximity varies by the side effect, and the chromatic aberration of magnification is difficult to correct.

At this point, more preferably, one of the following conditions (7a) and (8a) is satisfied.

$$1.53<nd\_LG4 \quad (7a)$$

$$38<vd\_LG4 \quad (8a)$$

Consequently, the effect is further improved.

Preferably, the imaging optical system having the above basic configuration satisfies the following condition (9):

$$1.5<|f\_G4|/fw<5 \quad (9)$$

where f_G4 is a focal distance of fourth lens group G4 and fw is a focal distance in the whole system at the wide angle end.

That is, the condition (9) defines the relationship between the focal distance of fourth lens group G4 and the focal distance of the whole system at the wide angle end.

When |f_G4|/fw is less than or equal to the lower limit (1.5) of the condition (9), the focal distance of fourth lens group G4 becomes small. Consequently, the variation in aberration becomes difficult to correct during the proximity. On the other hand, when |f_G4|/fw is greater than or equal to the upper limit (5) of the condition (9), the focal distance of fourth lens group G4 becomes large. Consequently, the movement amount of fourth lens group G4 becomes excessively large.

More preferably, one of the following conditions (9a) and (9b) is satisfied.

$$2.0<f\_G4/fw \quad (9a)$$

$$f\_G4/fw<4 \quad (9b)$$

Consequently, the effect is further improved.

Preferably, the imaging optical system having the above basic configuration satisfies the following conditions (10), (11):

$$1.75<nd\_L2F1 \quad (10)$$

$$25<vd\_L2F1 \quad (11)$$

where nd_L2F1 is a refractive index of lens L2F1 on the most object side of second lens group G2, and vd_L2F1 is an Abbe number of lens L2F1 on the most object side of second lens group G2.

That is, the conditions (10), (11) define the refractive index and Abbe number of lens L2F1 on the most object side of second lens group G2, respectively.

When nd_L2F1 is less than or equal to the lower limit (1.75) of the condition (10), the curvature radius of the image-side surface becomes small. Consequently, an inclination angle of the peripheral portion becomes excessively large, and the lens is difficult to produce. When vd_L2F1 is less than or equal to the lower limit (25) of the condition (11), the chromatic aberration of magnification at the wide angle end is difficult to correct.

At this point, more preferably, one of the following conditions (10a) and (11a) is satisfied.

$$1.78<nd\_L2F1 \quad (10a)$$

$$31<vd\_L2F1 \quad (11b)$$

Consequently, the effect is further improved.

Preferably, the imaging optical system having the above basic configuration satisfies the following condition (12):

$$0.8<t\_L2F2(70\%)/ct\_L2F2<1.5 \quad (12)$$

where t_L2F2 (70%) is a thickness of the lens having 70% of the height from an effective diameter of the object-side surface of second lens L2F2 from the object side of second lens group G2, and ct_L2F2 is a center thickness of second lens L2F2 from the object side of second lens group G2.

That is, the condition (12) defines the relationship between the thickness of the lens having 70% of the height from the effective diameter of the object-side surface of second lens L2F2 from the object side of second lens group G2 and the center thickness of second lens L2F2 from the object side of second lens group G2.

When t_L2F2 (70%)/ct_L2F2 is less than or equal to the lower limit (0.8) of the condition (12), the thickness of the lens becomes excessively thin. Consequently, an edge thickness is difficult to ensure at a height defining an outer diameter. On the other hand, when t_L2F2 (70%)/ct_L2F2 is greater than or equal to the upper limit (1.5) of the condition (12), the edge thickness becomes excessively large. Consequently, the lens (for example, lens L2F1) on the object side is enlarged.

At this point, more preferably, one of the following conditions (12a) and (12b) is satisfied.

$$0.9 < t\_L2F2(70\%)/ct\_L2F2 \quad (12a)$$

$$t\_L2F2(70\%)/ct\_L2F2 < 1.2 \quad (12b)$$

Consequently, the effect is further improved.

More preferably, one of the following conditions (12c) and (12d) is satisfied.

$$0.98 < t\_L2F2(70\%)/ct\_L2F2 \quad (12c)$$

$$t\_L2F2(70\%)/ct\_L2F2 < 1.06 \quad (12d)$$

Consequently, the effect is further improved.

In the imaging optical system having the above basic configuration, for example, preferably fourth lens group G4 is constructed with one lens. Consequently, the weight of fourth lens group G4 can be reduced. Thus, high-speed focusing can be performed during the focusing from the infinity focusing state to the proximity focusing state. The thickness on the optical axis of fourth lens group G4 can be shortened (thinned). Consequently, the imaging optical system can be downsized.

In the imaging optical system having the above basic configuration, preferably, aperture diaphragm A and third lens group G3 move integrally during, for example, the zooming from the wide angle end to the telephoto end. Consequently, a cam configuration that drives each lens group during the zooming can be reduced. Thus, the configuration of the lens barrel or the like, for example, can be simplified.

In the imaging optical system having the above basic configuration, preferably, for example, fourth lens group G4 is driven while being held in shaft 329 attached to third group frame 313 holding third lens group G3. Consequently, the cam configuration that drives each lens group during the zooming can be reduced. Thus, the configuration of the lens barrel or the like, for example, can be simplified.

In the imaging optical system having the above basic configuration, preferably, for example, an actuator that drives aperture diaphragm A, image blur correction lens L3R1 disposed in third lens group G3, and fourth lens group G4 that is the focusing lens group is disposed in a movement frame that moves integrally with third lens group G3. Consequently, a flexible wiring and a board, which supply electricity to the actuator, can be formed integrally. Resultantly, the configuration of the lens barrel in which the imaging optical system is accommodated can be simplified.

In the imaging optical system, a predetermined clearance is required to drive, for example, fourth lens group G4 that is the focusing lens group. Consequently, uneven blur is easily generated by a position error of fourth lens group G4 relative to third lens group G3. In the imaging optical system having the above basic configuration, as described later, a relative position adjustment mechanism is provided in third lens group G3 (third group frame 313 (see FIG. 18)). Consequently, the uneven blur caused by the relative position error can be prevented. Alternatively, the relative position adjustment mechanism may be provided in image blur correction lens L3R1 having uneven blur sensitivity relative to the focusing lens group, for example. Consequently, the uneven blur can similarly be prevented as described above.

In the imaging optical system of the first to fifth exemplary embodiments, the lens group having the negative power (in the present disclosure, corresponds to second lens group G2) located on the most object side may be constructed with at least two lenses having the negative power, namely, lens L2F1 having the negative power and lens L2F2 having the negative power in which both the surfaces are formed into an aspherical shape in order from object side toward the image side.

With this configuration, a thickness deviation ratio of the aspherical lens of lens L2F2 disposed in the lens group having the negative power located on the most object side can be decreased even in the wide-angle lens. Consequently, the spherical lens can be disposed as the lens L2F1 even if the thickness deviation ratio is increased. This enables the lens group to be thinned. Resultantly, a total length of the imaging optical system can be shortened.

In the case that the lens group having the positive power (in the present disclosure, corresponds to first lens group G1) is disposed on the object side with respect to the above lens group (so-called positive lead), the diameter of the lens group having the positive power can be decreased. The above configuration may be adapted to not only the positive lead but also a negative lead. In this case, the lens group having the negative power located on the most object side is disposed on the most object side of each lens group in the imaging optical system.

(Schematic Configuration of Imaging Device to Which First Exemplary Embodiment is Applied)

A schematic configuration of an imaging device to which the imaging optical system of the first exemplary embodiment is applied will be described below with reference to FIG. 16.

Figure 16:
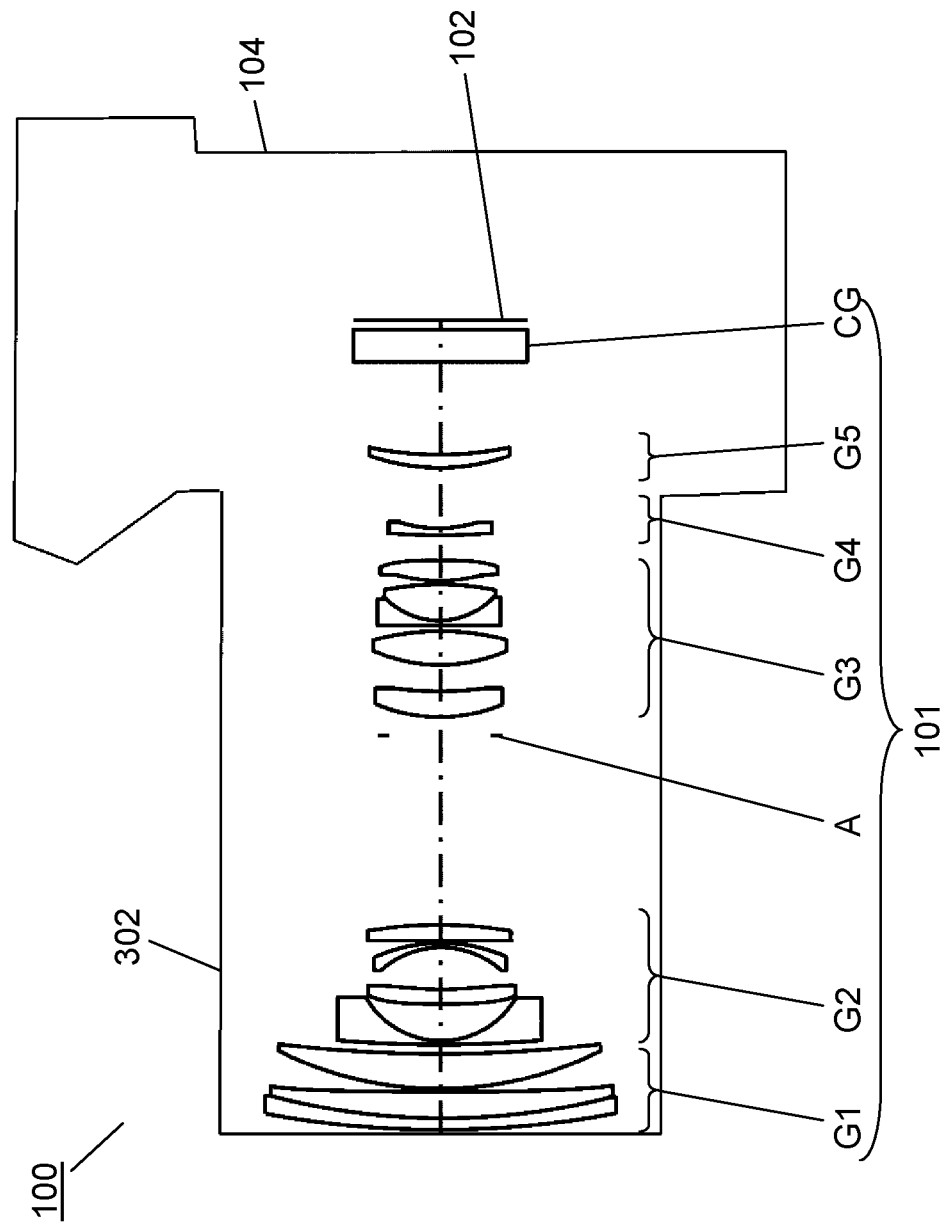
FIG. 16 is a schematic configuration diagram illustrating an imaging device provided with the imaging optical system of the first exemplary embodiment.

FIG. 16 is a schematic configuration diagram illustrating the imaging device provided with the imaging optical system of the first exemplary embodiment. Although an example in which the imaging optical system of the first exemplary embodiment is applied to the imaging device is illustrated in FIG. 16, the similar effect can be obtained in the imaging device to which the imaging optical system of any one of the second to fifth exemplary embodiments is applied.

As illustrated in FIG. 16, imaging device 100 includes casing 104 and lens barrel 302 connected to casing 104. Casing 104 includes imaging element 102. Lens barrel 302 includes imaging optical system 101. Imaging device 100 is exemplified by a digital camera.

Imaging optical system 101 includes first lens group G1, second lens group G2, third lens group G3, aperture diaphragm A, fourth lens group G4, and fifth lens group G5, and is accommodated in lens barrel 302. As described above, fourth lens group G4 and fifth lens group G5 constitute the succeeding lens group.

Lens barrel 302 holds each lens group constituting imaging optical system 101 and aperture diaphragm A.

Imaging element 102 is disposed at the position of image surface S in the imaging optical system of the first exemplary embodiment.

Casing 104 includes an actuator and a lens frame. Each lens group constituting imaging optical system 101 and aperture diaphragm A are disposed in the actuator and the lens frame so as to be movable during the zooming.

Imaging device 100 is configured as described above. Consequently, imaging device 100 having good various aberrations can be constructed.

In the above description, the imaging optical system is applied to the digital camera by way of example. However, the imaging optical system is not limited to the digital camera. For example, the imaging optical system may be applied to imaging devices such as a monitoring camera and a smartphone.

(Schematic Configuration of Camera System to Which First Exemplary Embodiment is Applied)

A schematic configuration of a camera system to which the imaging optical system of the first exemplary embodiment is applied will be described below with reference to FIG. 17.

Figure 17:
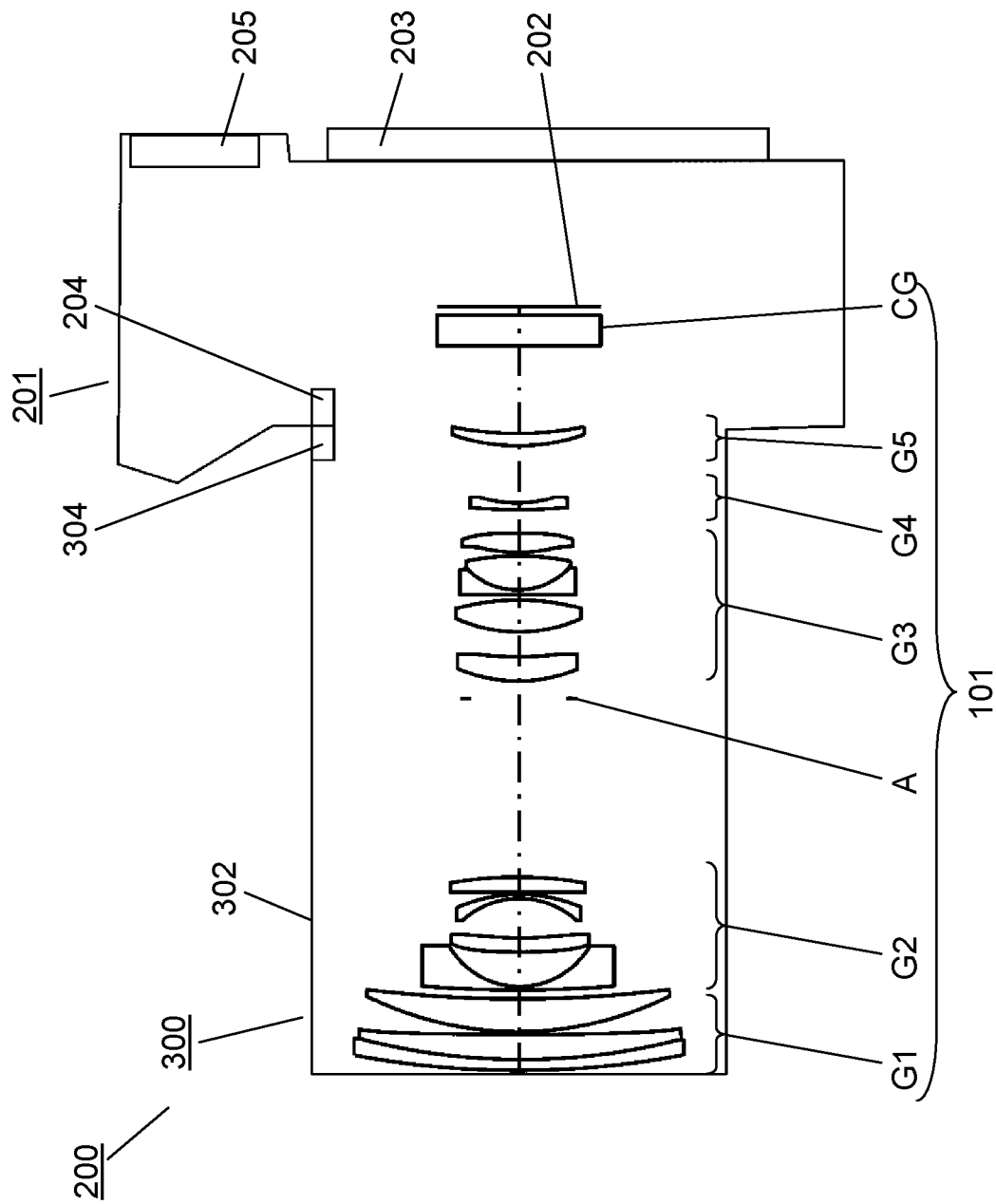
FIG. 17 is a schematic configuration diagram illustrating a camera system provided with the imaging optical system of the first exemplary embodiment.

FIG. 17 is a schematic configuration diagram illustrating the camera system provided with the imaging optical system of the first exemplary embodiment. Although an example in which the imaging optical system of the first exemplary embodiment is applied to the camera system is illustrated in FIG. 17, the similar effect can be obtained in the camera system to which the imaging optical system of any one of the second to fifth exemplary embodiments is applied. Camera system 200 is exemplified by a lens interchangeable digital camera system.

As illustrated in FIG. 17, camera system 200 includes camera body 201 and interchangeable lens device 300 detachably attached to camera body 201.

Camera body 201 includes imaging element 202, monitor 203, a memory (not illustrated) in which an image signal is stored, camera mount 204, finder 205, and the like. For example, imaging element 202 is constructed with a CCD. Imaging element 202 receives an optical image formed by the imaging optical system of interchangeable lens device 300, and converts the optical image into an electric image signal. For example, monitor 203 is constructed with an LCD. Monitor 203 displays the image signal converted by imaging element 202.

Interchangeable lens device 300 is provided with imaging optical system 101 including first lens group G1, second lens group G2, aperture diaphragm A, third lens group G3, fourth lens group G4, fifth lens group G5, and the like. As described above, fourth lens group G4 and fifth lens group G5 constitute the succeeding lens group.

Lens barrel 302 holds each lens group of imaging optical system 101 and aperture diaphragm A. Lens barrel 302 includes a lens mount 304 connected to camera mount 204 of camera body 201.

Camera mount 204 of camera body 201 and lens mount 304 of lens barrel 302 are physically connected to each other by a screw. A controller (not illustrated) of camera body 201 and a controller (not illustrated) of interchangeable lens device 300 are electrically connected to each other. That is, camera mount 204 and lens mount 304 function as an interface that can transmit and receive a signal.

Imaging optical system 101 includes each lens group held in lens barrel 302 of interchangeable lens device 300 and parallel plate CG of camera body 201.

Interchangeable lens device 300 includes the actuator controlled by the controller and the lens frame. Each lens group constituting imaging optical system 101 and aperture diaphragm A are disposed in the actuator and the lens frame so as to be movable during the zooming.

Camera system 200 is configured as described above. Consequently, camera system 200 having good various aberrations can be constructed.

(Schematic Configuration of Lens Barrel to Which First Exemplary Embodiment is Applied)

A schematic configuration of a lens barrel to which the imaging optical system of the first exemplary embodiment is applied will be described below with reference to FIG. 18.

FIG. 18 is a schematic configuration diagram illustrating lens barrel 302 provided with the imaging optical system of the first exemplary embodiment.

As illustrated in FIG. 18, lens barrel 302 includes first group frame 311, second group frame 312, third group frame 313, fourth group frame 314, and fifth group frame 315, which hold each lens group of the imaging optical system.

First group frame 311 holds first lens group G1. Second group frame 312 holds second lens group G2. Third group frame 313 holds aperture diaphragm A and third lens group G3. Fourth group frame 314 holds fourth lens group G4. Fifth group frame 315 holds fifth lens group G5.

Second group frame 312, third group frame 313, and fifth group frame 315 are engaged with rectilinear fixing frame 325, cam tube 320, and cam pin 326, and move along the optical axis direction. First group frame 311 is engaged with a groove in an outer peripheral surface of second group frame 312 via a pin (not illustrated) of first group frame 311, and moves along the optical axis direction.

Third group frame 313 includes actuator 328 and shaft 329. Actuator 328 is controlled by a controller (not illustrated), and drives fourth group frame 314 in the optical axis direction with respect to third group frame 313. Shaft 329 movably holds fourth group frame 314. Consequently, a cam configuration that drives each lens group during the zooming can be reduced. Resultantly, the configuration of lens barrel 302 can be simplified.

Third group frame 313 includes third group front frame 313*a*, OIS base frame 313*b*, OIS frame 313*c*, and actuator 327. Actuator 327 drives OIS frame 313*c* in a plane perpendicular to the optical axis with respect to OIS base frame 313*b*. Third group front frame 313*a* holds aperture diaphragm A and eighth lens L8 to eleventh lens L11. OIS frame 313*c* holds lens L3R1 by which twelfth lens L12 of third lens group G3 is exemplified. OIS base frame 313*b* supports OIS frame 313*c* via a ball (not illustrated) such that OIS frame 313*c* is movable from a reference position on the plane perpendicular to the optical axis. OIS is an abbreviation form for Optical Image Stabilizer, and indicates an optical camera shake correction function.

The controller (not illustrated) controls actuator 327 to move OIS frame 313*c* holding lens L3R1. This enables the image blur correction.

OIS base frame 313*b* includes the relative position adjustment mechanism as described above. The relative position adjustment mechanism moves OIS base frame 313*b* in two directions (an X-direction and a Y-direction) perpendicular to the optical axis with respect to third group front frame 313*a* by stress of eccentric pin 323. Consequently, the relative position of lens L3R1 is adjusted based on the reference position. Specifically, during shipping adjustment of lens barrel 302, the relative position of lens L3R1 is adjusted by eccentric pin 323, and fixed using an adhesive after the adjustment. Consequently, the uneven blur can be prevented.

Other Exemplary Embodiments

The technique disclosed in the present disclosure is described above with the first to fifth exemplary embodiments as examples.

However, the technique in the present disclosure is not limited to the first to fifth exemplary embodiments, and can also be applied to exemplary embodiments in which changes, replacements, additions, omissions, and the like are made.

In the imaging optical system of the first to fifth exemplary embodiments, the whole zooming range from the wide angle end to the telephoto end is used by way of example. However, the whole zooming range is not necessarily used. The range where the optical performance is ensured is cut out according to the desired zooming range, and may be used as the imaging optical system. That is, the range where the optical performance is ensured is cut out according to the desired zooming range may be used as the imaging optical system having the magnification lower than that of the imaging optical system of first to fifth numerical examples corresponding to the first to fifth exemplary embodiments. The focal distance where the optical performance is ensured is cut out according to the desired zooming position, and may be used as a short-focus imaging optical system.

In the imaging optical system of the first to fifth exemplary embodiments, by way of example, the image blur correction lens is moved in the direction perpendicular to the optical axis to perform the image blur correction, but the configuration is not limited thereto. That is, any movement system having a component to move in the direction perpendicular to the optical axis can correct the image blur. Therefore, when complication of the lens barrel structure is permitted, the image blur correction may be performed while the image blur correction lens is turned so as to have a turning center on the optical axis.

In the first to fifth exemplary embodiments, by way of example, each lens group constituting the imaging optical system is constructed only with the refraction type lens that deflects the incident beam by the refraction (that is, a lens in which the deflection is performed at an interface between mediums having different refractive indexes), but the configuration is not limited thereto. Alternatively, each lens group may be constructed with a diffraction type lens that deflects the incident beam by diffraction or a refraction-diffraction hybrid type lens in that deflects the incident beam by a combination of the refraction and the diffraction. Alternatively, each lens group may be constructed with a refractive index distribution type lens that deflects the incident beam by a refractive index distribution in the medium. In particular, in the refraction-diffraction hybrid type lens, preferably wavelength dependence on diffraction efficiency is improved when a diffraction structure is formed at the interface between the mediums having different refractive indexes. Consequently, the camera system having good various aberrations can be constructed.

Numerical Examples

Numerical examples specifically performed in the configuration of the imaging optical system of the first to fifth exemplary embodiments will be described below with reference to FIGS. 2, 3, 5, 6, 8, 9, 11 and 12.

In each numerical example, a unit of the length is (mm), and a unit of the angle of view is (degrees) in Tables. In each numerical example, r is a curvature radius, d is an interplanar spacing, nd is a refractive index to the d line, and vd is an Abbe number to the d line. In each numerical example, a surface denoted by an asterisk * is an aspherical surface. The aspherical shape is defined by the following equation. In each numerical example, a diaphragm diameter is an open aperture diameter that is effective at each zoom position.

$$Z = \frac{h^2/r}{1+\sqrt{1-(1+\kappa)(h/r)^2}} + \sum A_n h^n \qquad \text{[Mathematical Formula 1]}$$

where Z is a distance from a point on the aspherical surface having height h from the optical axis to a tangential plane at a peak of the aspherical surface, h is a height from the optical axis, r is a curvature radius at the peak, ii is a conic constant, and An is an aspherical coefficient of an n-th degree.

FIGS. 2, 5, 8, 11, 14 are views illustrating a longitudinal aberration in the infinity focusing state of the imaging optical system according to first to fifth numerical examples corresponding to the first to fifth exemplary embodiments.

In FIGS. 2, 5, 8, 11, 14, part (a) illustrates the longitudinal aberration at the wide angle end, part (b) illustrates the longitudinal aberration at the intermediate position, and part (c) illustrates the longitudinal aberration at the telephoto end. Parts (a) to (c) of FIGS. 2, 5, 8, 11, 14 illustrate spherical aberration (SA) (mm), astigmatism (AST) (mm), and distortion (DIS) (%) in order from the left.

In the view of the SA, a vertical axis indicates an F number (denoted by "F"), a solid line indicates a characteristic with respect to the d-line, a short broken line indicates a characteristic with respect to the F-line, and a long broken line indicates a characteristic with respect to the C-line. In the view of the AST, the vertical axis indicates an imaged height (denoted by "H"), the solid line indicates a characteristic with respect to a sagittal plane (denoted by "s"), and the broken line indicates a characteristic with respect to a meridional plane (denoted by "m"). In the view of the DIS, the vertical axis indicates the imaged height (denoted by "H").

FIGS. 3, 6, 9, 12, 15 are views illustrating a lateral aberration at the telephoto end of the imaging optical system of the first to fifth numerical examples corresponding to the first to fifth exemplary embodiments.

Parts (a) to (c) of each lateral aberration diagram illustrate a characteristic in the basic state in which the image blur correction is not performed at the telephoto end. Parts (d) to (f) of each lateral aberration diagram illustrate a characteristic in the image blur correction state in which the image blur correction lens group is moved in the direction perpendicular to the optical axis by a predetermined amount at the telephoto end.

In the basic state of each lateral aberration diagram, part (a) illustrates a characteristic corresponding to the lateral aberration at an image point of 70% of the maximum imaged height, part (b) illustrates a characteristic corresponding to the lateral aberration at an axial image point, and part (c) illustrates a characteristic corresponding to the lateral aberration at the image point of −70% of the maximum imaged height. Similarly, in the image blur correction state of each lateral aberration diagram, part (d) illustrates a characteristic corresponding to the lateral aberration at an image point of 70% of the maximum imaged height, part (e) illustrates a characteristic corresponding to the lateral aberration at an axial image point, and part (0 illustrates a characteristic corresponding to the lateral aberration at the image point of −70% of the maximum imaged height.

In each lateral aberration diagram, a horizontal axis indicates a distance from a principal light beam on a pupil surface, the solid line indicates the characteristic with respect to the d-line, the short broken line indicates the characteristic with respect to the F-line, and the long broken line indicates the characteristic with respect to the C-line. In each lateral aberration diagram, a plane including the optical axis of first lens group G1 and the optical axis of lens L3R1 is used as the meridional plane.

In the imaging optical system of each numerical example, the movement amount in the direction perpendicular to the optical axis of the image blur correction lens group in the image blur correction state at the telephoto end is indicated as follows.

| First numerical example | 0.261 mm |
|---|---|
| Second numerical example | 0.251 mm |
| Third numerical example | 0.241 mm |
| Fourth numerical example | 0.238 mm |
| Fifth numerical example | 0.247 mm |

At the telephoto end where the imaging distance is infinite, an image eccentric amount for the imaging optical system having the inclination of 0.4 degree is equal to an image eccentric amount for translation of the image blur correction lens group in the direction perpendicular to the optical axis by the above value.

In the above state, as can be seen from the lateral aberration diagrams of parts (b), (e) in FIGS. 3, 6, 9, 12, and 15, symmetry of the lateral aberration is good at the axial image point.

When the lateral aberration at the image point of +70% in the basic state illustrated in part (a) of FIGS. 3, 6, 9, 12, and 15 is compared to the lateral aberration at the image point of −70% in the basic state illustrated in part (c), the curvature is small, and the aberration curve has the substantially identical inclination. Thus, it is shown that an eccentric comatic aberration and an eccentric astigmatism are small. The above result means that imaging performance is sufficiently obtained even in the image blur correction state.

For the identical image blur correction angle of the imaging optical system, a translation amount necessary for the image blur correction decreases with decreasing focal distance of the whole imaging optical system. That is, at any zoom position, it is shown that the sufficient image blur correction can be performed without decreasing the imaging performance with respect to the image blur correction angle of about 0.4 degree.

First Numerical Example

A first numerical example of the imaging optical system corresponding to the first exemplary embodiment in FIG. 1 will be described below. Specifically, as the first numerical example, surface data is indicated in (Table 1), aspherical data is indicated in (Table 2), and various pieces of data in the infinity focusing state are indicated in (Table 3A) to (Table 3D).

TABLE 1

(surface data)

| Surface number | r | d | nd | vd | Effective diameter |
|---|---|---|---|---|---|
| Object surface | ∞ | | | | |
| 1 | 140.11690 | 1.50000 | 1.71736 | 29.5 | 22.053 |
| 2 | 76.07590 | 4.19500 | 1.59349 | 67.0 | 21.549 |
| 3 | 870.25920 | 0.20000 | | | 21.326 |
| 4 | 50.70040 | 4.29880 | 1.61800 | 63.4 | 20.334 |
| 5 | 160.51860 | variable | | | 19.935 |
| 6 | 135.90400 | 0.90000 | 1.80420 | 46.5 | 12.421 |
| 7 | 10.93990 | 4.53860 | | | 9.444 |
| 8* | 65.33210 | 2.00000 | 1.80569 | 40.5 | 9.072 |
| 9* | 46.69250 | 5.42140 | | | 8.621 |
| 10 | −12.88280 | 0.75000 | 1.59282 | 68.6 | 8.089 |
| 11 | −22.48820 | 0.20000 | | | 8.348 |
| 12 | 45835.44100 | 2.04130 | 1.92286 | 20.9 | 8.299 |
| 13 | −47.05830 | variable | | | 8.356 |
| 14 (diaphragm) | ∞ | 2.30000 | | | CIR |
| 15* | 21.31170 | 3.72080 | 1.68823 | 31.1 | 7.716 |
| 16* | 68.99660 | 3.26220 | | | 7.892 |
| 17 | 22.95640 | 4.20000 | 1.60801 | 46.2 | 7.998 |
| 18 | −38.47340 | 0.50000 | | | 7.793 |
| 19 | 198.78810 | 0.70000 | 2.00100 | 29.1 | 7.341 |
| 20 | 11.35080 | 4.90930 | 1.49700 | 81.6 | 6.856 |
| 21 | −80.59180 | 0.40000 | | | 6.909 |
| 22* | 28.66730 | 3.02830 | 1.55332 | 71.7 | 6.902 |
| 23* | −55.74090 | variable | | | 6.822 |
| 24* | 90.87910 | 1.00000 | 1.80569 | 40.5 | 6.047 |
| 25* | 19.35050 | variable | | | 6.005 |
| 26 | 28.78550 | 1.74580 | 1.92286 | 20.9 | 8.891 |
| 27 | 46.76110 | variable | | | 8.825 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 2

(aspherical data)

Eighth surface

K = −3.53047E+00, A4 = 6.22293E−05, A6 = 2.99860E−07, A8 = −8.88228E−09
A10 = 2.33260E−10, A12 = −2.42110E−12, A14 = 1.08796E−14
Ninth surface K = 0.00000E+00, A4 = 1.94271E−05, A6 = −1.64209E−07, A8 = 1.65145E−09
A10 = −7.38961E−12, A12 = 0.00000E+00, A14 = 0.00000E+00
Fifteenth surface K = 0.00000E+00, A4 = −2.67495E−05, A6 = −4.32483E−07, A8 = 2.73657E−09
A10 = −1.48711E−10, A12 = 1.84758E−12, A14 = −8.18122E−15
Sixteenth surface K = 0.00000E+00, A4 = 1.05076E−06, A6 = −4.17305E−07, A8 = −1.42321E−09
A10 = −2.80039E−11, A12 = 3.65868E−13, A14 = −3.35745E−16

TABLE 2-continued (aspherical data)

Twenty-second surface

K = 4.53865E+00, A4 = −4.16794E−05, A6 = −9.89240E−07, A8 = 8.02776E−09
A10 = −2.75765E−10, A12 = 1.40896E−12, A14 = 0.00000E+00

Twenty-third surface

K = 0.00000E+00, A4 = −6.82010E−06, A6 = −1.14308E−06, A8 = 1.27628E−08
A10 = −2.59262E−10, A12 = 1.03955E−12, A14 = 0.00000E+00

Twenty-fourth surface

K = 0.00000E+00, A4 = 7.88246E−05, A6 = −2.82183E−06, A8 = 5.80673E−08
A10 = −5.12763E−10, A12 = 0.00000E+00, A14 = 0.00000E+00

Twenty-fifth surface

K = 0.00000E+00, A4 = 7.98435E−05, A6 = −2.79673E−06, A8 = 5.68685E−08
A10 = −5.36803E−10, A12 = 0.00000E+00, A14 = 0.00000E+00

(Various Pieces of Data in Infinity Focusing State)

TABLE 3A (various pieces of data)
Zoom ratio 4.63436

| | Wide angle | Intermediate | Telephoto |
|---|---|---|---|
| Focal distance | 12.4680 | 26.8405 | 57.7811 |
| F number | 2.92249 | 3.63149 | 4.11990 |
| Angle of view | 41.7785 | 21.8341 | 10.5494 |
| Imaged height | 10.0000 | 10.8150 | 10.8150 |
| Lens total length | 104.2337 | 111.6470 | 139.3998 |
| BF | 0.02537 | 0.03639 | −0.05336 |
| Diaphragm diameter CIR | 6.4200 | 6.4200 | 6.9760 |
| d5 | 0.5517 | 13.9307 | 33.6892 |
| d13 | 24.2114 | 7.1726 | 0.2000 |
| d23 | 2.7529 | 3.6118 | 2.9434 |
| d25 | 7.7397 | 7.5145 | 13.9936 |
| d27 | 11.9411 | 22.3695 | 31.6155 |
| Entrance pupil position | 21.1681 | 41.4264 | 96.0134 |
| Exit pupil position | −48.6220 | −59.0024 | −82.1297 |
| Front-side principal point position | 30.4406 | 56.0645 | 113.1170 |
| Rear-side principal point position | 91.7657 | 84.8065 | 81.6188 |

TABLE 3B (single lens data)

| Lens | Start surface | Focal distance |
|---|---|---|
| 1 | 1 | −234.3216 |
| 2 | 2 | 140.1864 |
| 3 | 4 | 118.1490 |
| 4 | 6 | −14.8420 |
| 5 | 8 | −213.3427 |
| 6 | 10 | −52.4000 |
| 7 | 12 | 50.9406 |
| 8 | 15 | 43.4242 |
| 9 | 17 | 24.2743 |
| 10 | 19 | −12.0486 |
| 11 | 20 | 20.3805 |
| 12 | 22 | 34.6566 |
| 13 | 24 | −30.7064 |
| 14 | 26 | 77.5271 |

TABLE 3C (zoom lens group data)

| Group | Start surface | Focal distance | Lens configuration length | Front-side principal point position | Rear-side principal point position |
|---|---|---|---|---|---|
| 1 | 1 | 89.29874 | 10.19380 | 1.54681 | 5.40022 |
| 2 | 6 | −14.54016 | 15.85130 | 0.19655 | 1.68770 |
| 3 | 14 | 20.06561 | 23.02060 | 9.64984 | 12.65650 |
| 4 | 24 | −30.70636 | 1.00000 | 0.70804 | 1.15076 |
| 5 | 26 | 77.52709 | 1.74580 | −1.38916 | −0.51084 |

TABLE 3D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.21007 | −0.26040 | −0.40301 |
| 3 | 14 | −0.44048 | −0.68608 | −0.82413 |
| 4 | 24 | 1.96492 | 2.65669 | 3.78171 |
| 5 | 26 | 0.76793 | 0.63327 | 0.51517 |

Second Numerical Example

A second numerical example of the imaging optical system corresponding to the second exemplary embodiment in FIG. 4 will be described below. Specifically, as the second numerical example, the surface data is indicated in (Table 4), the aspherical data is indicated in (Table 5), and various pieces of data in the infinity focusing state are indicated in (Table 6A) to (Table 6D).

TABLE 4

(surface data)

| Surface number | r | d | nd | vd | Effective diameter |
|---|---|---|---|---|---|
| Object surface | ∞ | | | | |
| 1 | 124.29370 | 1.50000 | 1.71736 | 29.5 | 22.056 |
| 2 | 71.39080 | 4.13830 | 1.59349 | 67.0 | 21.531 |
| 3 | 632.35390 | 0.20000 | | | 21.326 |
| 4 | 52.37380 | 4.05700 | 1.61800 | 63.4 | 20.362 |
| 5 | 161.14700 | variable | | | 19.996 |
| 6 | 126.65120 | 0.90000 | 1.81139 | 43.9 | 12.414 |
| 7 | 11.15910 | 4.63130 | | | 9.444 |

TABLE 4-continued (surface data)

| Surface number | r | d | nd | vd | Effective diameter |
|---|---|---|---|---|---|
| 8* | 121.16680 | 2.00000 | 1.61014 | 51.7 | 9.104 |
| 9* | 62.41230 | 5.31500 | | | 8.663 |
| 10 | −12.98050 | 0.75000 | 1.59282 | 68.6 | 8.082 |
| 11 | −24.07450 | 0.20000 | | | 8.336 |
| 12 | −669.40520 | 1.94950 | 1.92286 | 20.9 | 8.299 |
| 13 | −42.12300 | variable | | | 8.359 |
| 14 (diaphragm) | ∞ | 2.30000 | | | CIR |
| 15* | 21.24200 | 3.45900 | 1.68108 | 30.3 | 7.696 |
| 16* | 72.46610 | 3.90780 | | | 7.892 |
| 17 | 23.49350 | 4.20000 | 1.60930 | 48.9 | 7.951 |
| 18 | −39.35450 | 0.50000 | | | 7.738 |
| 19 | 183.99350 | 0.70000 | 2.00100 | 29.1 | 7.301 |
| 20 | 11.42070 | 4.84830 | 1.49700 | 81.6 | 6.827 |
| 21 | −117.66870 | 0.40000 | | | 6.876 |
| 22* | 27.34430 | 3.08870 | 1.55332 | 71.7 | 6.883 |
| 23* | −56.77580 | variable | | | 6.806 |
| 24* | 83.90820 | 1.00000 | 1.80569 | 40.5 | 6.047 |
| 25* | 19.60440 | variable | | | 6.005 |
| 26 | 27.82830 | 1.72390 | 1.92286 | 20.9 | 8.847 |
| 27 | 43.00850 | variable | | | 8.772 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 5

(aspherical data)

Eighth surface

K = 1.99619E+01, A4 = 8.16048E−05, A6 = 2.89057E−07, A8 = −1.08616E−08
A10 = 2.61262E−10, A12 = −2.55306E−12, A14 = 1.14365E−14

Ninth surface

K = 0.00000E+00, A4 = 3.11163E−05, A6 = −2.19578E−07, A8 = −1.55407E−10
A10 = 1.05741E−11, A12 = 0.00000E+00, A14 = 0.00000E+00

Fifteenth surface

K = 0.00000E+00, A4 = −2.34791E−05, A6 = −4.08367E−07, A8 = 2.79647E−09
A10 = −1.51738E−10, A12 = 1.81493E−12, A14 = −7.70176E−15

Sixteenth surface

K = 0.00000E+00, A4 = 3.44835E−06, A6 = −3.80576E−07, A8 = −1.58733E−09
A10 = −3.09439E−11, A12 = 3.61840E−13, A14 = −2.32930E−16

Twenty-second surface

K = 4.53865E+00, A4 = −4.47754E−05, A6 = −9.96447E−07, A8 = 7.51677E−09
A10 = −2.87320E−10, A12 = 1.39416E−12, A14 = 0.00000E+00

Twenty-third surface

K = 0.00000E+00, A4 = −4.90719E−06, A6 = −1.13060E−06, A8 = 1.19488E−08
A10 = −2.70152E−10, A12 = 1.15917E−12, A14 = 0.00000E+00

Twenty-fourth surface

K = 0.00000E+00, A4 = 8.14258E−05, A6 = −2.77854E−06, A8 = 5.53028E−08
A10 = −4.71780E−10, A12 = 0.00000E+00, A14 = 0.00000E+00

Twenty-fifth surface

K = 0.00000E+00, A4 = 8.29983E−05, A6 = −2.77231E−06, A8 = 5.52907E−08
A10 = −5.06872E−10, A12 = 0.00000E+00, A14 = 0.00000E+00

(Various Pieces of Data in Infinity Focusing State)

TABLE 6A (various pieces of data)
Zoom ratio 4.63425

| | Wide angle | Intermediate | Telephoto |
|---|---|---|---|
| Focal distance | 12.4680 | 26.8404 | 57.7799 |
| F number | 2.93525 | 3.66517 | 4.17097 |
| Angle of view | 41.7771 | 21.8739 | 10.5657 |
| Imaged height | 10.0000 | 10.8150 | 10.8150 |
| Lens total length | 104.6901 | 111.6259 | 139.7981 |
| BF | 0.02840 | 0.03794 | −0.05211 |
| Diaphragm diameter CIR | 6.4200 | 6.4200 | 6.9760 |
| d5 | 0.5000 | 13.4597 | 33.4122 |
| d13 | 24.8413 | 7.3143 | 0.2000 |
| d23 | 2.7577 | 3.6743 | 2.7577 |
| d25 | 7.6858 | 8.1093 | 14.1751 |
| d27 | 11.9081 | 22.0616 | 32.3364 |
| Entrance pupil position | 21.0668 | 40.2846 | 94.0042 |
| Exit pupil position | −48.8299 | −60.2145 | −83.1409 |
| Front-side principal point position | 30.3531 | 55.1685 | 111.6040 |
| Rear-side principal point position | 92.2221 | 84.7856 | 82.0181 |

TABLE 6B (single lens data)

| Lens | Start surface | Focal distance |
|---|---|---|
| 1 | 1 | −236.6187 |
| 2 | 2 | 135.2262 |

TABLE 6B-continued (single lens data)

| Lens | Start surface | Focal distance |
|---|---|---|
| 3 | 4 | 123.7896 |
| 4 | 6 | −15.1347 |
| 5 | 8 | −213.7098 |
| 6 | 10 | −48.7418 |
| 7 | 12 | 48.6365 |
| 8 | 15 | 42.9470 |
| 9 | 17 | 24.7712 |
| 10 | 19 | −12.1890 |
| 11 | 20 | 21.2109 |
| 12 | 22 | 33.7966 |
| 13 | 24 | −31.9727 |
| 14 | 26 | 81.0177 |

TABLE 6C (zoom lens group data)

| Group | Start surface | Focal distance | Lens configuration length | Front-side principal point position | Rear-side principal point position |
|---|---|---|---|---|---|
| 1 | 1 | 90.09953 | 9.89530 | 1.37419 | 5.11054 |
| 2 | 6 | −14.76907 | 15.74580 | 0.14968 | 1.40517 |
| 3 | 14 | 20.47151 | 23.40380 | 9.90177 | 12.69126 |
| 4 | 24 | −31.97271 | 1.00000 | 0.72770 | 1.17002 |
| 5 | 26 | 81.01766 | 1.72390 | −1.55857 | −0.68486 |

TABLE 6D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.21130 | −0.25940 | −0.39934 |
| 3 | 14 | −0.44023 | −0.68962 | −0.83090 |
| 4 | 24 | 1.91603 | 2.55818 | 3.67950 |
| 5 | 26 | 0.77642 | 0.65097 | 0.52526 |

Third Numerical Example

A third numerical example of the imaging optical system corresponding to the third exemplary embodiment in FIG. 7 will be described below. Specifically, as the third numerical example, the surface data is indicated in (Table 7), the aspherical data is indicated in (Table 8), and various pieces of data in the infinity focusing state are indicated in (Table 9A) to (Table 9D).

TABLE 7

(surface data)

| Surface number | r | d | nd | vd | Effective diameter |
|---|---|---|---|---|---|
| Object surface | ∞ | | | | |
| 1 | 115.93830 | 1.50000 | 1.71736 | 29.5 | 21.648 |
| 2 | 67.86520 | 4.13480 | 1.59349 | 67.0 | 21.115 |
| 3 | 449.55820 | 0.20000 | | | 20.892 |
| 4 | 51.90540 | 4.09710 | 1.61800 | 63.4 | 19.995 |
| 5 | 166.74500 | variable | | | 19.612 |
| 6 | 100.55570 | 0.90000 | 1.85011 | 42.1 | 12.213 |
| 7 | 11.17920 | 4.61930 | | | 9.411 |
| 8* | 303.64950 | 2.00000 | 1.51760 | 63.5 | 9.021 |
| 9* | 79.13580 | 5.09900 | | | 8.592 |
| 10 | −12.31560 | 0.75000 | 1.59282 | 68.6 | 8.033 |
| 11 | −23.36210 | 0.20000 | | | 8.337 |
| 12 | −219.80790 | 1.96040 | 1.92286 | 20.9 | 8.333 |
| 13 | −36.34040 | variable | | | 8.417 |
| 14 (diaphragm) | ∞ | 2.30000 | | | CIR |
| 15* | 20.87890 | 2.45690 | 1.68893 | 31.1 | 7.863 |
| 16* | 107.85230 | 5.04170 | | | 7.961 |
| 17 | 26.65580 | 4.20000 | 1.62691 | 43.7 | 7.970 |
| 18 | −32.31080 | 0.50000 | | | 7.759 |
| 19 | −109.19700 | 0.70000 | 1.99522 | 27.4 | 7.332 |
| 20 | 12.39460 | 4.87970 | 1.49700 | 81.6 | 6.929 |
| 21 | −64.34830 | 0.40000 | | | 7.042 |
| 22* | 29.08590 | 3.10000 | 1.58699 | 59.5 | 7.098 |
| 23* | −55.77130 | variable | | | 7.093 |
| 24* | 150.04690 | 1.00000 | 1.80569 | 40.5 | 6.290 |
| 25* | 22.53300 | variable | | | 6.248 |
| 26 | 29.90380 | 1.73940 | 1.92286 | 20.9 | 8.906 |
| 27 | 49.69340 | variable | | | 8.844 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 8

(aspherical data)

Eighth surface

K = 0.00000E+00, A4 = 8.41481E−05, A6 = 4.06802E−07, A8 = −1.48458E−08
A10 = 3.48510E−10, A12 = −3.58432E−12, A14 = 1.73908E−14
Ninth surface K = 0.00000E+00, A4 = 1.95072E−05, A6 = −1.21165E−07, A8 = −3.89838E−09
A10 = 3.97125E−11, A12 = 0.00000E+00, A14 = 0.00000E+00
Fifteenth surface K = 0.00000E+00, A4 = −1.26441E−06, A6 = −2.18351E−07, A8 = 2.23556E−09
A10 = −1.25056E−10, A12 = 1.29159E−12, A14 = −6.59727E−15
Sixteenth surface K = 0.00000E+00, A4 = 2.75736E−05, A6 = −1.69569E−07, A8 = −8.34041E−10
A10 = −3.86512E−11, A12 = 9.87915E−14, A14 = 5.15723E−17

TABLE 8-continued (aspherical data)

Twenty-second surface

K = 4.53865E+00, A4 = −4.14226E−05, A6 = −8.91467E−07, A8 = 7.58704E−09
A10 = −2.22320E−10, A12 = 6.82602E−13, A14 = 0.00000E+00
Twenty-third surface K = 0.00000E+00, A4 = −7.95010E−06, A6 = −9.49523E−07, A8 = 1.05037E−08
A10 = −2.31190E−10, A12 = 8.31223E−13, A14 = 0.00000E+00
Twenty-fourth surface K = 0.00000E+00, A4 = 1.08170E−04, A6 = −2.53610E−06, A8 = 3.93661E−08
A10 = −2.89378E−10, A12 = 0.00000E+00, A14 = 0.00000E+00
Twenty-fifth surface K = 0.00000E+00, A4 = 1.13589E−04, A6 = −2.54770E−06, A8 = 3.92112E−08
A10 = −3.05452E−10, A12 = 0.00000E+00, A14 = 0.00000E+00

(Various Pieces of Data in Infinity Focusing State)

TABLE 9A (various pieces of data)
Zoom ratio 4.63422

| | Wide angle | Intermediate | Telephoto |
|---|---|---|---|
| Focal distance | 12.4681 | 26.8404 | 57.7798 |
| F number | 2.92793 | 3.65313 | 4.14126 |
| Angle of view | 41.7664 | 21.9171 | 10.5545 |
| Imaged height | 10.0000 | 10.8150 | 10.8150 |
| Lens total length | 105.0295 | 111.9287 | 140.7183 |
| BF | 0.02802 | 0.03775 | −0.04650 |
| Diaphragm diameter CIR | 6.5250 | 6.5250 | 7.0620 |
| d5 | 0.5000 | 12.8474 | 33.0442 |
| d13 | 24.5675 | 7.0402 | 0.2000 |
| d23 | 3.0816 | 4.1000 | 3.0816 |
| d25 | 8.1182 | 7.8779 | 13.3915 |
| d27 | 11.7559 | 23.0472 | 34.0692 |
| Entrance pupil position | 20.8380 | 38.9845 | 93.7145 |
| Exit pupil position | −52.0710 | −63.3446 | −86.5003 |
| Front-side principal point position | 30.3222 | 54.4588 | 112.8782 |
| Rear-side principal point position | 92.5614 | 85.0884 | 82.9385 |

TABLE 9B (single lens data)

| Lens | Start surface | Focal distance |
|---|---|---|
| 1 | 1 | −231.1705 |
| 2 | 2 | 134.1388 |
| 3 | 4 | 120.3119 |
| 4 | 6 | −14.8638 |
| 5 | 8 | −207.4109 |
| 6 | 10 | −45.0747 |
| 7 | 12 | 46.9371 |
| 8 | 15 | 37.1534 |
| 9 | 17 | 23.9561 |
| 10 | 19 | −11.1526 |
| 11 | 20 | 21.3621 |
| 12 | 22 | 33.0130 |
| 13 | 24 | −33.0252 |
| 14 | 26 | 78.0742 |

TABLE 9C (zoom lens group data)

| Group | Start surface | Focal distance | Lens configuration length | Front-side principal point position | Rear-side principal point position |
|---|---|---|---|---|---|
| 1 | 1 | 88.72878 | 9.93190 | 1.32319 | 5.07192 |
| 2 | 6 | −14.31899 | 15.52870 | 0.18072 | 1.34116 |
| 3 | 14 | 20.96489 | 23.57830 | 10.41456 | 12.31310 |
| 4 | 24 | −33.02517 | 1.00000 | 0.65396 | 1.09821 |
| 5 | 26 | 78.07423 | 1.73940 | −1.31159 | −0.44016 |

TABLE 9D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.20792 | −0.25334 | −0.39419 |
| 3 | 14 | −0.46076 | −0.73243 | −0.88085 |
| 4 | 24 | 1.89786 | 2.59546 | 3.84280 |
| 5 | 26 | 0.77288 | 0.62813 | 0.48804 |

Fourth Numerical Example

A fourth numerical example of the imaging optical system corresponding to the fourth exemplary embodiment in FIG. 10 will be described below. Specifically, as the fourth numerical example, the surface data is indicated in (Table 10), the aspherical data is indicated in (Table 11), and various pieces of data in the infinity focusing state are indicated in (Table 12A) to (Table 12D).

TABLE 10

(surface data)
Surface data

| Surface number | r | d | nd | vd | Effective diameter |
|---|---|---|---|---|---|
| Object surface | ∞ | | | | |
| 1 | 135.16250 | 1.50000 | 1.71736 | 29.5 | 22.398 |
| 2 | 72.11820 | 4.36010 | 1.59349 | 67.0 | 21.857 |
| 3 | 790.20610 | 0.20000 | | | 21.643 |
| 4 | 50.28130 | 4.40750 | 1.61800 | 63.4 | 20.614 |
| 5 | 162.92050 | variable | | | 20.220 |

TABLE 10-continued (surface data)
Surface data

| Surface number | r | d | nd | vd | Effective diameter |
|---|---|---|---|---|---|
| 6 | 96.45270 | 0.90000 | 1.88300 | 40.8 | 1.915 |
| 7 | 11.11750 | 4.77320 | | | 9.260 |
| 8* | −396.79630 | 2.00000 | 1.51760 | 63.5 | 8.870 |
| 9* | 175.07390 | 4.80450 | | | 8.508 |
| 10 | −12.24460 | 0.75000 | 1.59387 | 66.9 | 7.986 |
| 11 | −23.61010 | 0.20000 | | | 8.306 |
| 12 | −176.40500 | 2.00630 | 1.92286 | 20.9 | 8.324 |
| 13 | −33.62740 | variable | | | 8.421 |
| 14 (diaphragm) | ∞ | 1.53080 | | | CIR |
| 15* | 18.08250 | 2.76550 | 1.68893 | 31.1 | 7.930 |
| 16* | 131.52500 | 4.08410 | | | 7.875 |
| 17 | 36.49880 | 4.20000 | 1.57658 | 42.5 | 7.626 |
| 18 | −20.85700 | 0.50000 | | | 7.440 |
| 19 | −31.14780 | 0.70000 | 1.99195 | 26.6 | 6.978 |
| 20 | 13.89760 | 4.99570 | 1.49700 | 81.6 | 6.748 |
| 21 | −28.68020 | 0.40000 | | | 6.975 |
| 22* | 29.47400 | 3.10000 | 1.58699 | 59.5 | 7.018 |
| 23* | −52.26740 | variable | | | 6.974 |
| 24* | −289.06210 | 1.00000 | 1.58699 | 59.5 | 6.178 |
| 25* | 21.45410 | variable | | | 6.188 |
| 26 | 29.83220 | 1.76670 | 1.84666 | 23.8 | 8.874 |
| 27 | 51.29650 | variable | | | 8.822 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 11

(aspherical data)

Eighth surface

K = 0.00000E+00, A4 = 1.00075E−04, A6 = 2.67945E−07, A8 = −1.50094E−08
A10 = 3.65562E−10, A12 = −3.87661E−12, A14 = 1.83152E−14

Ninth surface

K = 0.00000E+00, A4 = 3.36259E−05, A6 = −3.17271E−07, A8 = −2.07768E−09
A10 = 1.71320E−11, A12 = 0.00000E+00, A14 = 0.00000E+00

Fifteenth surface

K = 0.00000E+00, A4 = 1.69020E−05, A6 = 1.00433E−07, A8 = 5.21866E−09
A10 = −9.78881E−11, A12 = 1.45031E−12, A14 = −3.64471E−15

Sixteenth surface

K = 0.00000E+00, A4 = 5.59440E−05, A6 = 2.34295E−07, A8 = 3.16770E−09
A10 = −9.31279E−12, A12 = 2.53688E−13, A14 = 4.34360E−15

Twenty-second surface

K = 4.53865E+00, A4 = −5.72496E−05, A6 = −8.58523E−07, A8 = 7.90840E−09
A10 = −1.77922E−10, A12 = 3.82054E−13, A14 = 0.00000E+00

Twenty-third surface

K = 0.00000E+00, A4 = −2.61556E−05, A6 = −8.63483E−07, A8 = 1.09617E−08
A10 = −1.91537E−10, A12 = 5.16628E−13, A14 = 0.00000E+00

Twenty-fourth surface

K = 0.00000E+00, A4 = 1.86067E−04, A6 = −4.82396E−06, A8 = 7.41794E−08
A10 = −5.13206E−10, A12 = 0.00000E+00, A14 = 0.00000E+00

Twenty-fifth surface

K = 0.00000E+00, A4 = 1.94211E−04, A6 = −4.84034E−06, A8 = 7.21369E−08
A10 = −5.09876E−10, A12 = 0.00000E+00, A14 = 0.00000E+00

(Various Pieces of Data in Infinity Focusing State)

TABLE 12A (various pieces of data)
Zoom ratio 4.63376

| | Wide angle | Intermediate | Telephoto |
|---|---|---|---|
| Focal distance | 12.4683 | 26.8395 | 57.7752 |
| F number | 2.92739 | 3.65906 | 4.14030 |
| Angle of view | 41.7734 | 21.8572 | 10.5331 |
| Imaged height | 10.0000 | 10.8150 | 10.8150 |
| Lens total length | 105.0236 | 112.5104 | 140.8015 |
| BF | 0.01932 | 0.03546 | −0.05735 |
| Diaphragm diameter CIR | 6.6650 | 6.6650 | 7.2030 |
| d5 | 0.5000 | 13.3360 | 33.9988 |
| d13 | 25.1558 | 7.8469 | 0.9692 |
| d23 | 3.1697 | 3.7055 | 3.1697 |
| d25 | 8.2922 | 6.8974 | 13.8634 |
| d27 | 11.7422 | 24.5447 | 33.3133 |
| Entrance pupil position | 20.9289 | 40.3653 | 96.7328 |
| Exit pupil position | −51.4321 | −61.7674 | −85.3680 |
| Front-side principal point position | 30.3757 | 55.5491 | 115.3807 |
| Rear-side principal point position | 92.5553 | 85.6708 | 83.0262 |

TABLE 12B (single lens data)

| Lens | Start surface | Focal distance |
|---|---|---|
| 1 | 1 | −217.6988 |
| 2 | 2 | 133.4170 |

TABLE 12B-continued (single lens data)

| Lens | Start surface | Focal distance |
|---|---|---|
| 3 | 4 | 115.9479 |
| 4 | 6 | −14.3016 |
| 5 | 8 | −234.4128 |
| 6 | 10 | −43.9108 |
| 7 | 12 | 44.7187 |
| 8 | 15 | 30.1313 |
| 9 | 17 | 23.6528 |
| 10 | 19 | −9.6135 |
| 11 | 20 | 19.5993 |
| 12 | 22 | 32.5638 |
| 13 | 24 | −33.9838 |
| 14 | 26 | 81.1443 |

TABLE 12C (zoom lens group data)

| Group | Start surface | Focal distance | Lens configuration length | Front-side principal point position | Rear-side principal point position |
|---|---|---|---|---|---|
| 1 | 1 | 87.85887 | 10.46760 | 1.60854 | 5.56398 |
| 2 | 6 | −14.25269 | 15.43400 | −0.05210 | 0.91085 |
| 3 | 14 | 21.11225 | 22.27610 | 9.73062 | 10.99134 |
| 4 | 24 | −33.98384 | 1.00000 | 0.58589 | 0.95652 |
| 5 | 26 | 81.14431 | 1.76670 | −1.28132 | −0.43652 |

TABLE 12D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 6 | −0.20882 | −0.25718 | −0.40312 |
| 3 | 14 | −0.46374 | −0.73036 | −0.87570 |
| 4 | 24 | 1.87535 | 2.60848 | 3.60613 |
| 5 | 26 | 0.78145 | 0.62348 | 0.51656 |

Fifth Numerical Example

A fifth numerical example of the imaging optical system corresponding to the fifth exemplary embodiment in FIG. 13 will be described below. Specifically, as the fifth numerical example, the surface data is indicated in (Table 13), the aspherical data is indicated in (Table 14), and various pieces of data in the infinity focusing state are indicated in (Table 15A) to (Table 15D).

TABLE 13

(surface data)

Surface data

| Surface number | r | d | nd | vd | Effective diameter |
|---|---|---|---|---|---|
| Object surface | ∞ | | | | |
| 1 | 54.68100 | 1.50000 | 1.76182 | 26.6 | 24.616 |
| 2 | 32.82140 | 9.36600 | 1.63658 | 46.6 | 22.508 |
| 3 | 580.36840 | variable | | | 22.141 |
| 4 | 105.08370 | 0.90000 | 1.76416 | 46.6 | 15.942 |
| 5 | 12.18440 | 5.70200 | | | 10.946 |
| 6* | 178.03120 | 2.00000 | 1.58699 | 59.5 | 10.803 |
| 7* | 72.78390 | 6.01450 | | | 10.200 |
| 8 | −15.79720 | 0.75000 | 1.55010 | 72.3 | 9.566 |
| 9 | −38.36620 | 0.20000 | | | 9.720 |
| 10 | 246.39640 | 1.98350 | 1.92501 | 20.5 | 9.628 |
| 11 | −70.24510 | variable | | | 9.646 |
| 12 (diaphragm) | ∞ | 0.82080 | | | 6.921 |
| 13* | 17.20220 | 2.73740 | 1.68590 | 38.3 | 7.998 |
| 14* | 79.25880 | 3.13140 | | | 7.827 |
| 15 | 33.46240 | 4.20000 | 1.57668 | 40.2 | 7.923 |
| 16 | −22.40720 | 0.50000 | | | 7.793 |
| 17 | −33.16650 | 0.70000 | 1.99659 | 29.4 | 7.401 |
| 18 | 14.35710 | 5.09370 | 1.49700 | 81.6 | 7.218 |
| 19 | −26.38940 | 0.40000 | | | 7.484 |
| 20* | 31.88940 | 3.10000 | 1.56798 | 62.2 | 7.586 |
| 21* | −46.70960 | variable | | | 7.602 |
| 22* | 550.04530 | 1.00000 | 1.64062 | 58.6 | 5.920 |
| 23* | 18.60810 | variable | | | 6.027 |
| 24 | 24.75620 | 1.77990 | 1.60713 | 34.7 | 7.551 |
| 25 | 73.48980 | variable | | | 7.572 |
| 26 | −40.51080 | 1.50000 | 1.72916 | 54.7 | 9.200 |
| 27 | −82.77720 | 11.70000 | | | 9.511 |
| 28 | ∞ | 4.20000 | 1.51680 | 64.2 | |
| 29 | ∞ | 1.00000 | | | |
| 30 | ∞ | BF | | | |
| Image surface | ∞ | | | | |

TABLE 14

(aspherical data)

Sixth surface

K = 0.00000E+00, A4 = 9.03227E−05, A6 = 2.37974E−07, A8 = −9.40223E−09
A10 = 1.59850E−10, A12 = −1.17710E−12, A14 = 3.76057E−15

Seventh surface

K = 0.00000E+00, A4 = 6.41410E−05, A6 = −1.45091E−07, A8 = −5.10014E−10
A10 = 8.20552E−12, A12 = 0.00000E+00, A14 = 0.00000E+00

Thirteenth surface

K = 0.00000E+00, A4 = 2.00288E−05, A6 = 1.02099E−07, A8 = 5.54625E−09
A10 = −1.03623E−10, A12 = 1.28036E−12, A14 = −5.36079E−15

Fourteenth surface

K = 0.00000E+00, A4 = 6.33712E−05, A6 = 2.70325E−07, A8 = 2.75300E−09
A10 = −1.47997E−11, A12 = 1.73066E−13, A14 = 1.74151E−16

TABLE 14-continued (aspherical data)

Twentieth surface

K = 4.53865E+00, A4 = −5.87475E−05, A6 = −7.42444E−07, A8 = 8.86640E−09
A10 = −1.29300E−10, A12 = −1.91561E−13, A14 = 0.00000E+00

Twenty-first surface

K = 0.00000E+00, A4 = −3.23199E−05, A6 = −7.64616E−07, A8 = 1.41535E−08
A10 = −2.05627E−10, A12 = 3.91779E−13, A14 = 0.00000E+00

Twenty-second surface

K = 0.00000E+00, A4 = 1.95149E−04, A6 = −4.77097E−06, A8 = 7.13337E−08
A10 = −5.05341E−10, A12 = 0.00000E+00, A14 = 0.00000E+00

Twenty-third surface

K = 0.00000E+00, A4 = 2.04564E−04, A6 = −4.76772E−06, A8 = 6.63174E−08
A10 = −4.66752E−10, A12 = 0.00000E+00, A14 = 0.00000E+00

(Various Pieces of Data in Infinity Focusing State)

TABLE 15A (various pieces of data)
Zoom ratio 4.63447

|  | Wide angle | Intermediate | Telephoto |
|---|---|---|---|
| Focal distance | 12.4680 | 26.8474 | 57.7825 |
| F number | 2.92725 | 3.57203 | 4.14033 |
| Angle of view | 41.6249 | 21.6929 | 10.3795 |
| Imaged height | 9.9600 | 10.8150 | 10.8150 |
| Lens total length | 111.6531 | 114.4265 | 139.5001 |
| BF | 0.00020 | 0.04282 | −0.01968 |
| Diaphragm diameter CIR | 6.9210 | 6.9210 | 7.3140 |
| d3 | 0.5000 | 15.3503 | 37.7357 |
| d11 | 31.8886 | 10.7749 | 1.6792 |
| d21 | 3.0172 | 5.5567 | 5.0638 |
| d23 | 3.5057 | 5.2825 | 6.6779 |
| d25 | 2.4622 | 7.1401 | 18.0840 |
| Entrance pupil position | 24.7084 | 47.6398 | 107.1162 |
| Exit pupil position | −39.6165 | −45.4085 | −52.4469 |
| Front-side principal point position | 33.2526 | 58.6288 | 101.2139 |
| Rear-side principal point position | 99.1851 | 87.5791 | 81.7176 |

TABLE 15B (single lens data)

| Lens | Start surface | Focal distance |
|---|---|---|
| 1 | 1 | −111.0660 |
| 2 | 2 | 54.2879 |
| 3 | 4 | −18.1120 |
| 4 | 6 | −211.2302 |
| 5 | 8 | −49.4003 |
| 6 | 10 | 59.2714 |
| 7 | 13 | 31.4670 |
| 8 | 15 | 23.9302 |
| 9 | 17 | −9.9807 |
| 10 | 18 | 19.5192 |
| 11 | 20 | 33.8494 |
| 12 | 22 | −30.0864 |
| 13 | 24 | 60.6521 |
| 14 | 26 | −110.4617 |

TABLE 15C (zoom lens group data)

| Group | Start surface | Focal distance | Lens configuration length | Front-side principal point position | Rear-side principal point position |
|---|---|---|---|---|---|
| 1 | 1 | 109.38949 | 10.86600 | −1.14641 | 3.20698 |
| 2 | 4 | −15.43257 | 17.55000 | 1.19226 | 3.35725 |
| 3 | 12 | 20.61438 | 20.68330 | 8.59944 | 10.31336 |
| 4 | 22 | −30.08638 | 1.00000 | 0.63133 | 1.02136 |
| 5 | 24 | 60.65213 | 1.77990 | −0.55494 | 0.13253 |
| 6 | 26 | −110.46172 | 17.40000 | −0.84407 | 1.20628 |

TABLE 15D (zoom lens group magnification)

| Group | Start surface | Wide angle | Intermediate | Telephoto |
|---|---|---|---|---|
| 1 | 1 | 0.00000 | 0.00000 | 0.00000 |
| 2 | 4 | −0.18241 | −0.22124 | −0.32579 |
| 3 | 12 | −0.39405 | −0.64826 | −0.84772 |
| 4 | 22 | 1.95781 | 2.37527 | 3.73197 |
| 5 | 24 | 0.70086 | 0.62321 | 0.44354 |
| 6 | 26 | 1.15565 | 1.15604 | 1.15548 |

(Corresponding Value of Condition)

As described above, the imaging optical system of the first to fifth exemplary embodiments is specifically implemented in the first to fifth numerical examples.

(Table 1) illustrates values corresponding to the conditions (1) to (12) in each numerical example.

TABLE 1

| Condition | First numerical example | Second numerical example | Third numerical example | Fourth numerical example | Fifth numerical example |
|---|---|---|---|---|---|
| (1) | 3.4830 | 3.445 | 2.980 | 2.417 | 2.524 |
| (2) | 0.837 | 0.871 | 0.906 | 0.993 | 0.948 |
| (3) | 1.80569 | 1.61014 | 1.5176 | 1.5176 | 1.58699 |
| (4) | 40.5 | 51.7 | 63.5 | 63.5 | 59.5 |
| (5) | 0.157 | 0.185 | 0.237 | 0.197 | 0.158 |
| (6) | 1.609 | 1.642 | 1.681 | 1.693 | 1.653 |
| (7) | 1.80569 | 1.80569 | 1.80569 | 1.58699 | 1.64062 |
| (8) | 40.5 | 40.5 | 40.5 | 59.5 | 58.6 |
| (9) | 2.463 | 2.564 | 2.649 | 2.726 | 2.413 |
| (10) | 1.80420 | 1.81139 | 1.85011 | 1.88300 | 1.76416 |

TABLE 1-continued

| Condition | First numerical example | Second numerical example | Third numerical example | Fourth numerical example | Fifth numerical example |
|---|---|---|---|---|---|
| (11) | 46.5 | 43.9 | 42.1 | 40.8 | 46.6 |
| (12) | 1.019 | 1.025 | 1.029 | 1.018 | 1.056 |

As illustrated in (Table 1), it is shown that the imaging optical system implemented in the first to fifth numerical examples satisfies the conditions (1) to (12).

Therefore, the compact, high-magnification imaging optical system having good imaging performance in the whole zoom range, and the imaging device and camera system provided with the imaging optical system can be constructed.

Because the above exemplary embodiments are provided for exemplifying the technique in the present disclosure, various modifications, substitutions, additions and omissions can be made within the scope of claims and equivalent scope of claims.

What is claimed is:

1. An imaging optical system comprising:
in order from an object side toward an image side,
a first lens group having positive power;
a second lens group having negative power;
a third lens group having positive power; and
a succeeding lens group including one or more lens groups,
wherein the third lens group includes
a lens L3F1 having positive power and
a lens L3F2 having positive power in order from the object side toward the image side in the third lens group,
and includes, on the image side than the lens L3F2
a lens L3R1 having positive power,
a lens L3R2 having positive power, and
a lens L3R3 having negative power in order from the image side toward the object side in the third lens group,
one optical surface of the lens L3R2 and one optical surface of the lens L3R3 are bonded to each other,
the lens L3R1 moves so as to have a component to move in a direction perpendicular to an optical axis, and optically corrects image blur, and
the succeeding lens group includes
a fourth lens group having negative power and being located closest to the object side in the succeeding lens group,
and a lens group having positive power,
during zooming from a wide angle end to a telephoto end in imaging, at least the second lens group and the third lens group move in an optical axis direction such that a distance between the second lens group and the third lens group changes.

2. The imaging optical system according to claim 1, wherein a following condition (1) is satisfied:

$$0.5 < f\_L3F1/fw < 15 \quad (1)$$

where f_L3F1 is a focal distance of the lens L3F1, and fw is a focal distance in a whole system at the wide angle end.

3. The imaging optical system according to claim 1, wherein the second lens group includes
a lens L2F1 having negative power and
a lens L2F2 having negative power in order from the object side toward the image side in the second lens group,
and includes, on the image side than the lens L2F2,
a lens L2R1 having positive power and
a lens L2R2 having negative power in order from the image side toward the object side in the second lens group.

4. The imaging optical system according to claim 3, wherein the lens L2R2 of the second lens group has a meniscus shape convex to the image side.

5. The imaging optical system according to claim 3, wherein a following condition (2) is satisfied:

$$0.5 < TH2\_A/TH2\_B < 1.5 \quad (2)$$

where TH2_A is an air distance between the lens L2F1 of the second lens group and the lens L2F2 of the second lens group, and TH2_B is an air distance between the lens L2R2 of the second lens group and the lens L2F2 of the second lens group.

6. The imaging optical system according to claim 3, wherein following conditions (3) and (4) are satisfied:

$$1.45 < nd\_L2F2 \quad (3)$$

$$35 < vd\_L2F2 \quad (4)$$

where nd_L2F2 is a refractive index of the lens L2F2 of the second lens group, and vd_L2F2 is an Abbe number of the lens L2F2 of the second lens group.

7. The imaging optical system according to claim 1, wherein a following condition (5) is satisfied:

$$0.05 < TH3\_A/TH3\_3G < 0.5 \quad (5)$$

where TH3_A is an air distance between the lens L3F1 of the third lens group and the lens L3F2 of the third lens group, and TH3_3G is a center distance from the lens L3F1 to the lens L3R1 of the third lens group.

8. The imaging optical system according to claim 1, wherein a following condition (6) is satisfied:

$$1.0 < f\_G3/fw < 7 \quad (6)$$

where f_G3 is a focal distance of the third lens group, and fw is a focal distance in a whole system at the wide angle end.

9. The imaging optical system according to claim 1, wherein
following conditions (7) and (8) are satisfied:

$$1.50 < nd\_LG4 \quad (7)$$

$$35 < vd\_LG4 \quad (8)$$

where nd_LG4 is a refractive index of a lens constituting the fourth lens group, and vd_LG4 is an Abbe number of the lens constituting the fourth lens group.

10. The imaging optical system according to claim 1, wherein
a following condition (9) is satisfied:

$$1.5 < |f\_G4|/fw < 5 \quad (9)$$

where f_G4 is a focal distance of the fourth lens group, and fw is a focal distance in a whole system at the wide angle end.

11. The imaging optical system according to claim 1, wherein following conditions (10) and (11) are satisfied:

$$1.75 < nd\_L2F1 \quad (10)$$

$$25 < vd\_L2F1 \quad (11)$$

where nd_L2F1 is a refractive index of a lens L2F1 of the second lens group, and vd_L2F1 is an Abbe number of the lens L2F1 of the second lens group.

12. A camera system comprising:
an interchangeable lens device including the imaging optical system according to claim 1; and
a camera body that is detachably connected to the interchangeable lens device via a camera mount, the camera body including an imaging element that receives an optical image formed by the imaging optical system and converts the optical image into an electric image signal,
wherein the interchangeable lens device forms the optical image of an object in the imaging element.

13. An imaging device that converts an optical image of an object into an electric image signal and performs at least one of display and storage of the converted image signal, the imaging device comprising:
the imaging optical system according to claim 1 that forms the optical image of the object; and
an imaging element that converts the optical image formed by the imaging optical system into the electric image signal.

14. The imaging optical system according to claim 1, wherein the second lens group includes
a lens L2F1 having negative power and being located closest to the object side in the second lens group
and includes
a lens L2R1 having positive power,
a lens L2R2 having negative power, and
a lens L2m having negative power and being located between the lens L2F1 and the lens L2R2 in order from the image side toward the object side in the second lens group.

15. The imaging optical system according to claim 14, wherein a following condition (2)' is satisfied:

$$0.5 < TH2\_A/TH2\_B < 1.5 \qquad (2)'$$

where TH2_A is an air distance between the lens L2F1 of the second lens group and the lens L2m of the second lens group, and TH2_B is an air distance between the lens L2R2 of the second lens group and the lens L2m of the second lens group.

* * * * *